United States Patent
Hutcheson

(10) Patent No.: US 7,454,193 B2
(45) Date of Patent: *Nov. 18, 2008

(54) SYSTEM AND METHOD FOR PROVIDING WIRELESS COMMUNICATIONS SERVICES

(75) Inventor: S. Douglas Hutcheson, San Diego, CA (US)

(73) Assignee: Cricket Communications, Inc., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/635,807

(22) Filed: Dec. 7, 2006

(65) Prior Publication Data

US 2007/0167150 A1     Jul. 19, 2007

Related U.S. Application Data

(63) Continuation of application No. 10/045,635, filed on Oct. 19, 2001, now abandoned.

(51) Int. Cl.
*H04M 11/00* (2006.01)

(52) U.S. Cl. ............... 455/406; 455/456.2; 455/432.1; 705/40; 379/114.02

(58) Field of Classification Search ......... 455/405–408, 455/432.1, 456.1; 379/114.01–132; 705/40; 725/1–8
See application file for complete search history.

(56) References Cited

U.S. PATENT DOCUMENTS

| | | | |
|---|---|---|---|
| 5,303,297 A * | 4/1994 | Hillis | 455/406 |
| 5,508,707 A * | 4/1996 | LeBlanc et al. | 342/457 |
| 5,553,131 A * | 9/1996 | Minervino et al. | 379/114.01 |
| 5,600,706 A * | 2/1997 | Dunn et al. | 455/456.2 |
| 5,664,006 A * | 9/1997 | Monte et al. | 455/405 |
| 5,684,861 A * | 11/1997 | Lewis et al. | 455/405 |
| 5,754,634 A * | 5/1998 | Kay et al. | 379/112.01 |
| 6,006,085 A * | 12/1999 | Balachandran | 455/406 |
| 6,073,012 A * | 6/2000 | Vanden Heuvel et al. | 455/427 |
| 6,198,915 B1 * | 3/2001 | McGregor et al. | 455/406 |
| 6,252,952 B1 * | 6/2001 | Kung et al. | 379/114.1 |
| 6,456,839 B1 * | 9/2002 | Chow et al. | 455/408 |
| 6,574,465 B2 * | 6/2003 | Marsh et al. | 455/406 |
| 6,813,488 B2 * | 11/2004 | Marsh et al. | 455/406 |
| 6,847,815 B1 * | 1/2005 | Graf et al. | 455/406 |

* cited by examiner

*Primary Examiner*—Sharad Rampuria
(74) *Attorney, Agent, or Firm*—Fish & Richardson P.C.

(57) ABSTRACT

A method for providing wireless communications services including setting a given rate associated with a given period of time for the wireless communications services in a service area for at least one subscriber. Unlimited use of the wireless communications are enabled for the at least one subscriber within the service area for the period of time upon receipt of a corresponding payment of the given rate. The service area substantially coincides with a modeled geographic area indicative of anticipated participation of the at least one subscriber in at least one selected from the group consisting of living, working, playing, shopping and travelling, and system for implementing same.

48 Claims, 38 Drawing Sheets

PROOF OF CONCEPT
CHATTANOOGA

CRICKET WAS EBITDA BREAK-EVEN IN CHATTANOOGA AT 12 MONTHS 7.7% PENETRATION  12 MONTHS  5 YEARS
24,000 CUSTOMERS
AS OF 2/29/00

COSTS IN <u>FIRST</u> YEAR

| | | |
|---|---|---|
| COST PER GROSS ADD | <$230 | $550 |
| SUPPORT COSTS/AVERAGE SUB | $5.60 | $11.45 |
| OPERATIONS COST/MOU | $0.013 | $0.039 |

*FIG. 18*

CAPITAL UTILIZATION

| | YEAR FROM SYSTEM LAUNCH | | | | | |
|---|---|---|---|---|---|---|
| | 1 | 2 | 3 | 4 | 5 | 10 |
| (IN THOUSANDS OF DOLLARS) | | | | | | |
| CUMULATIVE ANTICIPATED CAPITAL EXPENDITURE PER SUBSCRIBER (AVERAGE) | | | | | | |
| POWERTEL (GSM) | 9,516 | 4,613 | 2,528 | 1,689 | 1,280 | 692 |
| SPRINT (CDMA) | 19,367 | 4,349 | 1,860 | 954 | 729 | 586 |
| PRESENT INVENTION | 2,354 | 2,628 | 1,949 | 1,183 | 877 | 550 |
| CAPITAL EXPENDITURE PER ERLANG (AVERAGE) | | | | | | |
| POWERTEL (GSM) | 278 | 163 | 98 | 70 | 56 | 33 |
| SPRINT (CDMA) | 968 | 217 | 93 | 47 | 36 | 29 |
| PRESENT INVENTION | 47 | 52 | 38 | 23 | 17 | 11 |

*FIG. 19*

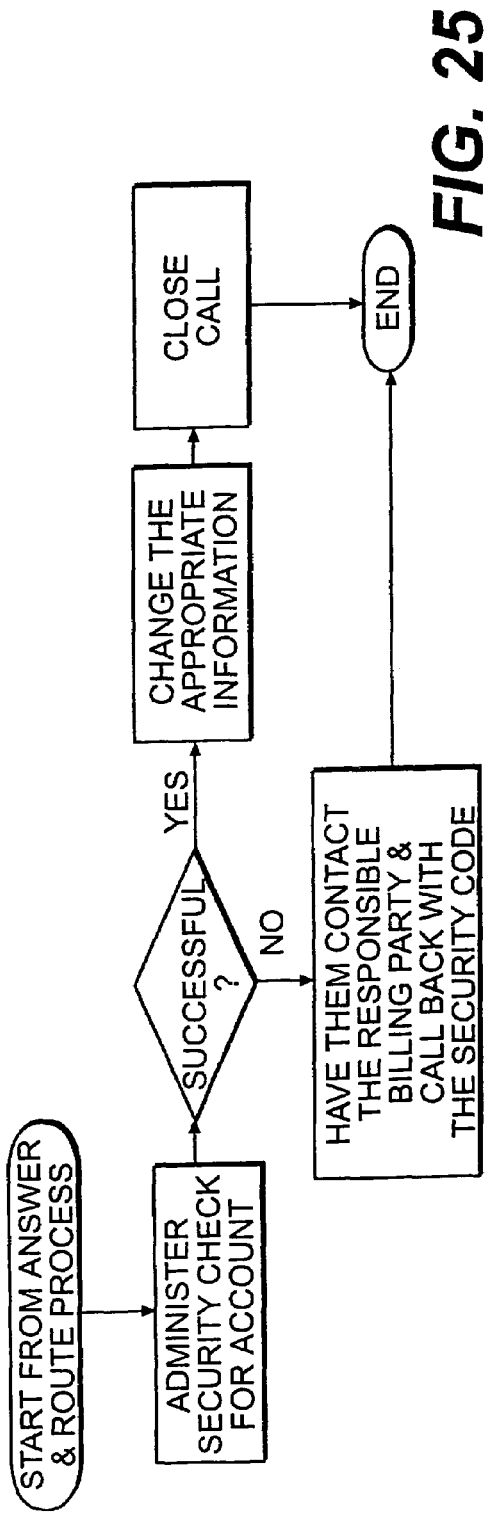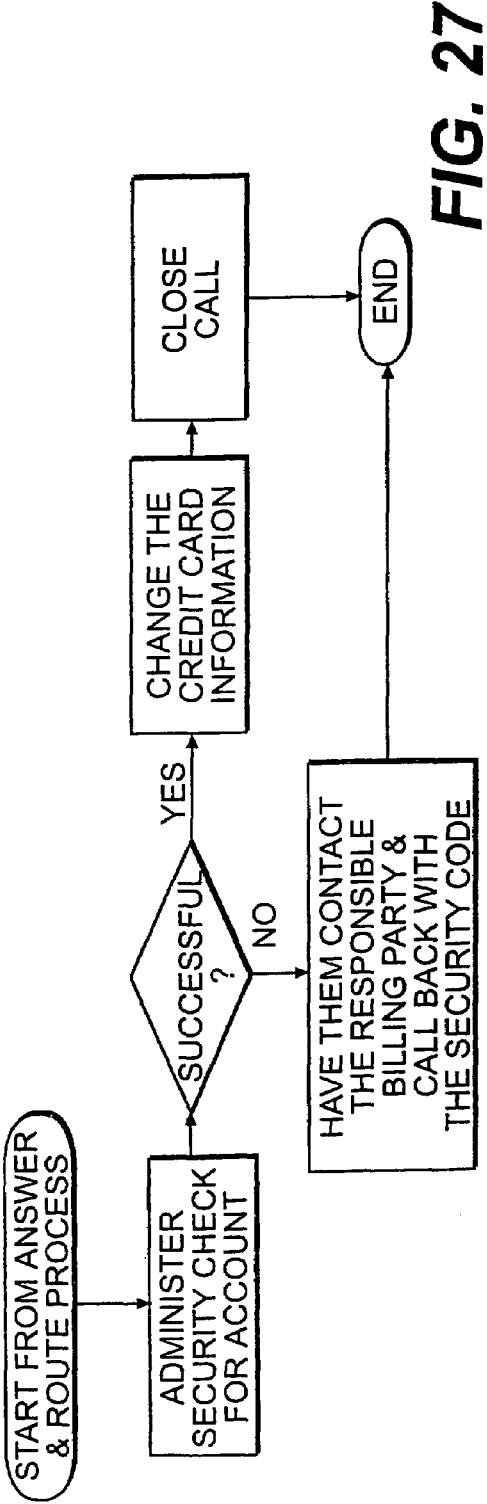

SYSTEM AND METHOD FOR PROVIDING WIRELESS COMMUNICATIONS SERVICES

CROSS REFERENCE TO RELATED APPLICATIONS

This Application is a continuation of patent application Ser. No. 10/045,635, entitled SYSTEM AND METHOD FOR PROVIDING WIRELESS COMMUNICATIONS NETWORK SERVICES, filed on Oct. 19, 2001 now abandoned. The entire disclosure of this application is incorporated herein.

BACKGROUND OF THE INVENTION

1. Field of the Invention

The present invention relates generally to communications systems, and more particularly to wireless communications systems, and the implementation and operation of wireless communications systems.

2. Description of Background

Wireless communications services represent a segment of the Worldwide telecommunications industry. Although the Telecommunications Act of 1996 may have been intended to open the competitive environment in the United States, allowing many new entrants into the local access loop, for example, growth has largely been constrained by several factors. Some of these factors include, but are not limited to, factors endemic to many communications systems, such as limited bandwidth and capital costs as well as other constraints.

Conventional cellular networks are typically constructed to achieve a relatively uniform level of coverage over a service area. The service area typically extends to a larger area, such as to metropolitan or major population centers and major highway connections. Generally, the service area has been specifically adapted to serve roaming traffic, which may typically be billed at a higher rate. Roaming occurs when the mobile unit is outside the coverage area of its "home" cellular service provider and an alternative cellular provider handles the communication. A conventional wireless communications system is described by Robert C. Raciti, in CELLULAR TECHNOLOGY (July 1995), and CELLULAR NETWORK INFRASTRUCTURE VOICE AND SHORT MESSAGE SERVICES, Telecommunications Standards Advisory Council of Canada (1997).

Wireless communications networks typically comprise three basic components: cell sites with RF base stations; Mobile Telephone Switching Offices (MTSO); and mobile phones that are provided to users or subscribers. Each base station typically includes a radio transceiver and controller, and provides radio communications to the mobile phone units operating in its cell. The cells are typically engineered into a network that is deployed in a hexagonal cell pattern, in order to provide local, regional, or national cellular coverage. The MTSO can link calls together using traditional copper, fiber optic, and/or microwave technology and act as a central office exchange, allowing users to place a call on local and/or long distance public telephone systems or mobile to mobile traffic. Mobile units may also be connected to the Public Switched Telephone Network (PSTN) operated by an Incumbent Local Exchange Carrier (ILEC), Competitive Local Exchange Carrier (CLEC), Regional Bell Operating Company (RBOC), long distance carrier, or other telecommunications provider.

Mobile communications devices can take the form of handheld phones, car phones, notebook computers, personal digital assistants, pen-based computers, palm-top computers, pagers, hand-held e-mail devices (such as those produced under the Blackberry™ brand), and portable data collection devices, to name a few. It is believed that, although the majority of cellular traffic may have traditionally been voice communications, the relative proportion of traffic that comprises data, text, and video, as a portion of a communicated message is increasing and is expected to increase dramatically in the coming years. The present invention is intended to work with all suitable wireless communications devices.

Network capacity is conventionally rationed, to avoid overuse of the network, by maintaining pricing levels that tend to limit casual usage. Use is conventionally metered by price.

FIG. 1 illustrates a conventional relationship between the cellular network infrastructure and a PSTN in wireless communications systems. FIG. 2 illustrates functions and interfaces that support voice services. The interface reference points are defined in the IS-41 standard, which is incorporated herein by reference, to ensure a proper interoperation of equipment.

A main feature of a cellular network voice service when compared with POTS (Plain Old Telephone Service) is the geographical mobility of the mobile phone. The equipment and interfaces depicted in FIGS. 2 and 3 perform two main functions. First, the equipment and interfaces transmit and receive voice signals over the radio spectrum. Second, the equipment and interfaces track where each mobile phone is within the cellular network. This is called "mobility management" and can be performed by a Management Services Center (MSC). Other interfaces connect the cellular network to existing land line telephone networks, such as a PSTN or Integrated Services Digital Network (ISDN) for example, support authentication of users and equipment, or support special features, such as the Short Message Service, as shown in. FIG. 3.

Some generally accepted consensus standards applicable to wireless communications systems in general are identified in Tables 1-2, each of which standards are incorporated herein by reference.

TABLE 1

Standards Applicable to Wireless Communications Interfaces

| Interface | Applicable ITU/ISO | Comments ANSI/TIA/EIA |
|---|---|---|
| A: BS to MSC Interface | n/a | N/aIS-634 |
| Ai: MSC to PSTN interface | X.25 | SS7IS-93-A |
| B: MSC to VLR interface | X.25 | SS7IS-41.2, IS-41.3 |
| C: MSC to HLR interface | X.25 | SS7IS-41.2, IS-41.3 |
| D: VLR to HLR interface | X.25 | SS7IS-41.2, IS-41.3 |
| Di: MSC to ISDN interface | ? | T1.611IS-93-A |
| E: MSC to MSC interface | X.25 | SS7IS-41.2, IS-41.3, IS-41.4 |
| F: MSC to EIR interface | Not defined | not defined; |
| H: HLR to AC interface | X.25 | SS7IS-41.2, IS-41.3 |
| Q: | X.25 | SS7IS-41.2, IS-41.3 |
| Um: BS to MS interface, which corresponds to the air interface | N/a | N/aIS-54-B (TDMA and AMPS), IS-88 (NAMPS), IS-95-A (CDMA) |

Consensus standards for wireless communications networks have been promulgated by various bodies. Table 2 identifies some of these standards, each of which are incorporated herein by reference.

TABLE 2

Wireless Communications Standards

| | |
|---|---|
| ANSI/TIA/EIA Standards: | |
| TIA/EIA-660 | Uniform Dialing Procedures and Call Processing Treatment for Cellular Radio Telecommunications; Telecommunications Industry Association |
| TIA/EIA-664 | Cellular Features Description; Telecommunications Industry Association |
| TIA/EIA/IS-93 | Cellular Radio Telecommunications Ai-Di Interfaces Standard; Telecommunications Industry Association |
| TIA/EIA/IS-41-C.1 | Cellular Radio Telecommunications Intersystem Operations: Functional Overview; Telecommunications Industry Association |
| TIA/EIA/IS-41-C.2 | Cellular Radio Telecommunications Intersystem Operations: Intersystem Hand-off Information Flows; Telecommunications Industry Association |
| TIA/EIA/IS-41-C.3 | Cellular Radio Telecommunications Intersystem Operations: Automatic Roaming Information Flows; Telecommunications Industry Association |
| TIA/EIA/IS-41-C.4 | Cellular Radio Telecommunications Intersystem Operations: Operations, Administration, and Maintenance Information Flows and Procedures; Telecommunications Industry Association |
| TIA/EIA/IS-41-C.5 | Cellular Radio Telecommunications Intersystem Operations: Signaling Protocols; Telecommunications Industry Association |
| TIA/EIA/IS-41-C.6 | Cellular Radio Telecommunications Intersystem Operations:, Signaling Procedures; Telecommunications Industry Association |
| TIA/EIA/IS-732 | Cellular Digital Packet Data Specification; Telecommunications Industry Association |
| TIA/EIA/IS-634 | 800-MHZ A-Interface Supporting AMPS, NAMPS, CDMA, TDMA Air Interfaces; Telecommunications Industry |
| AMPS: | |
| IEA/TIA-553 | Mobile Station - Land Station Compatibility Specification |
| CDMA: | |
| TIA/EIA/IS-95 | A Mobile Station - Base Station Compatibility Standard for Dual-Mode Wideband Spread Spectrum Cellular System; Telecommunications Industry Association |
| TIA/EIA/IS-97 | Recommended Minimum Performance Standards for Base Stations Supporting Dual-Mode Wideband Spread Spectrum Cellular Mobile Stations; Telecommunications Industry Association |
| TIA/EIA/IS-637 | Short Message Services for Wideband Spread Spectrum Cellular System; Telecommunications Industry Association |
| DMH: | |
| TIA/EIA/IS-124 | Cellular Radio Telecommunications Intersystem Non-Signaling Data Communications (DMH); Telecommunications Industry Association |
| NAMPS: | |
| TIA/EIA/IS-88 | Mobile Station - Land Station Compatibility Standard for Dual-Mode Narrow Band Analog Cellular Technology; Telecommunications Industry Association |
| TIA/EIA/IS-91 | Mobile Station - Base Station Compatibility Standard for 800 MHZ Analog Cellular; Telecommunications Industry Association |
| TDMA: | |
| TIA/EIA/IS-54-B | Cellular System Dual-Mode Mobile Station - Base Station Compatibility Standard; Telecommunications Industry Association |
| TIA/EIA/IS-136 | 800 MHz TDMA Cellular - Radio Interface - Mobile Station - Base Station Compatibility Standard; Telecommunications Industry Association |
| ANSI T1 Standards: | |
| T1.111 | Signaling System Number 7 - Message Transfer Part (MTP) |
| T1.112 | Signaling System Number 7 - Signaling Connection Control Part (SCCP) |
| T1.114 | System Number 7 - Transaction Capabilities Application Part (TCAP) |
| T1.611 | Signaling System Number 7 (SS7) - Supplementary Services for Non-ISDN-Subscribers |
| T1.209 | Operations, Administration, Maintenance, and Provisioning (OAM&P) - Network Tones and Announcements |
| ITU-T Standards: | |
| T.50 | International Reference Alphabet (IRA) formerly Alphabet No. 5 (or IA5) |
| Other Related Documents: | |
| SR-TSV-002275 | Notes on the LEC Networks; Bell Communications Research Inc. |
| TR-NWT-000776 | Network Interface Description for National ISDN-1 Customer Access; Bell Communications Research Inc. |

FIG. 3 depicts a cellular network, which further includes a Message Center (MC) and Short Message Entity (SME). The interface reference points in FIG. 3, which support, for example, the Short Message Service, are as follows: Interface M is the SME to MC interface; Interface N is the MC to BLR interface.

The conventional cellular industry typically characterizes usage patterns based upon the number of minutes a phone is used during a billing cycle, such as each month. Table 3 identifies characteristic usage patterns by the number of minutes used per month.

TABLE 3

Traditional Market Segmentation
Prior to the Present Invention
Based upon Minutes of Usage (MOU)

| Usage | Minutes of Use per Month | Average Revenue per User |
|---|---|---|
| Very Heavy | >500 | >$100 |
| Heavy | 400-500 min./mo. | >$75 |
| Business | 200-300 min./mo. | $40-75 |
| Consumer | 100-150 min./mo. | $25-40 |
| Mass Market | 15-20 min./mo. | $15-25 |

In a conventional cellular network, the mass market customer group is often considered sensitive to price, relative to heavy users. Prior to the present invention, due to the deficiencies of the generally accepted business model for cellular operations, marketing efforts were not generally devoted to this customer segment. Yet, it is believed this lowest customer segment (in terms of usage and ARPU) is also the most numerous.

Therefore, the need exists for a telecommunications method and system that will provide more desirable service to the largest user segments, which segments are, at present, substantially under-serviced, and which will provide this method and system in a profitable manner for the system operator.

SUMMARY OF THE INVENTION

A method for providing wireless communications services, the method including: setting a given rate associated with a given period of time for the wireless communications services in a service area for at least one subscriber; and, enabling, for the at least one subscriber, unlimited use of the wireless communications services within the service area for the period of time upon receipt of a corresponding payment of the given rate; wherein the service area substantially coincides with a modeled geographic area indicative of anticipated participation of the at least one subscriber in at least one selected from the group consisting of living, working, playing, shopping and travelling, and system for implementing same.

BRIEF DESCRIPTION OF THE DRAWINGS

For the present invention to be clearly understood and readily practiced, the present invention will be described in conjunction with the following figures, wherein like reference numerals designate like elements, and wherein:

FIG. 18 is a slide illustrating the break even point for an implementation of a system according to the present invention;

FIG. 19 is a Table comparing the expected relative Capital Utilization requirements between GSM and CDMA systems of the types known prior to the present invention and the present invention;

FIG. 25 is a flowchart depicting how to change general information on an existing account in a preferred embodiment of the present invention;

FIG. 27 is a flowchart depicting a process for changing credit card information in a preferred embodiment of the present invention;

DETAILED DESCRIPTION OF THE INVENTION

Figure 1:
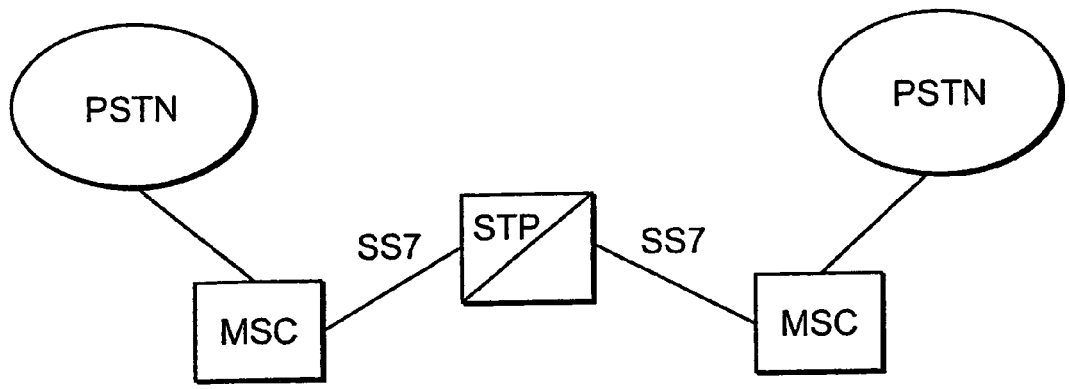
FIG. 1 is a. schematic diagram showing the relationship of a cellular network of the type known prior to the present invention to the public switched telephone network.
Figure 2:
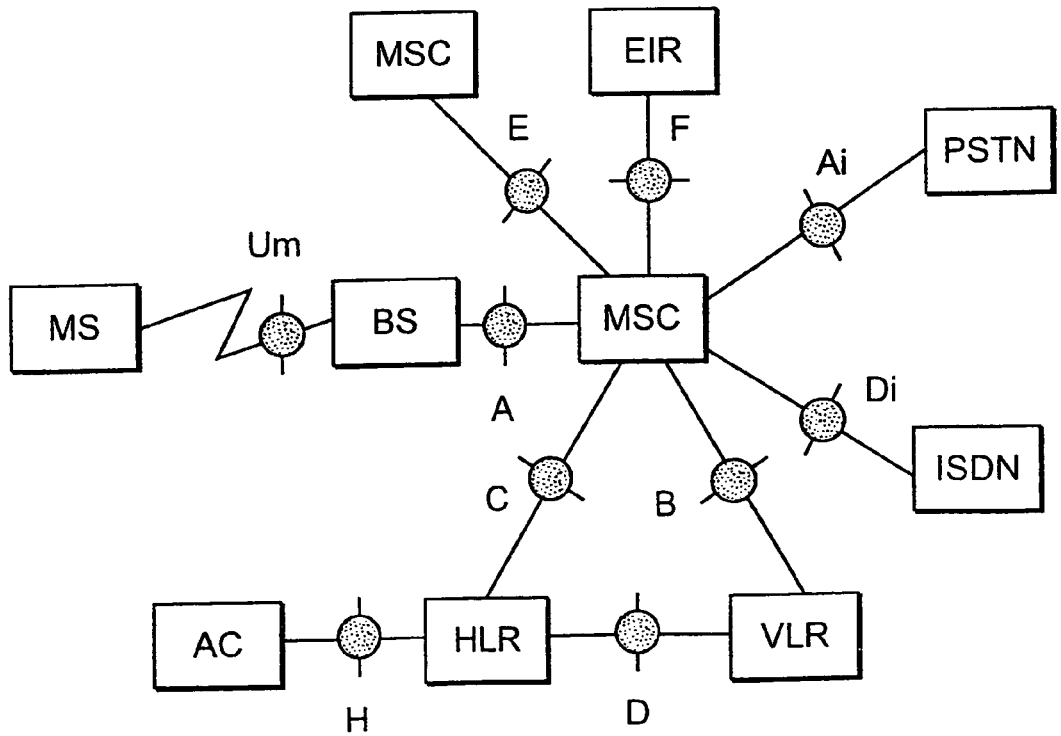
FIG. 2 is a schematic diagram showing the interrelationship of the principal components of a cellular system adapted for voice communications of the type known prior to the present invention.
Figure 3:
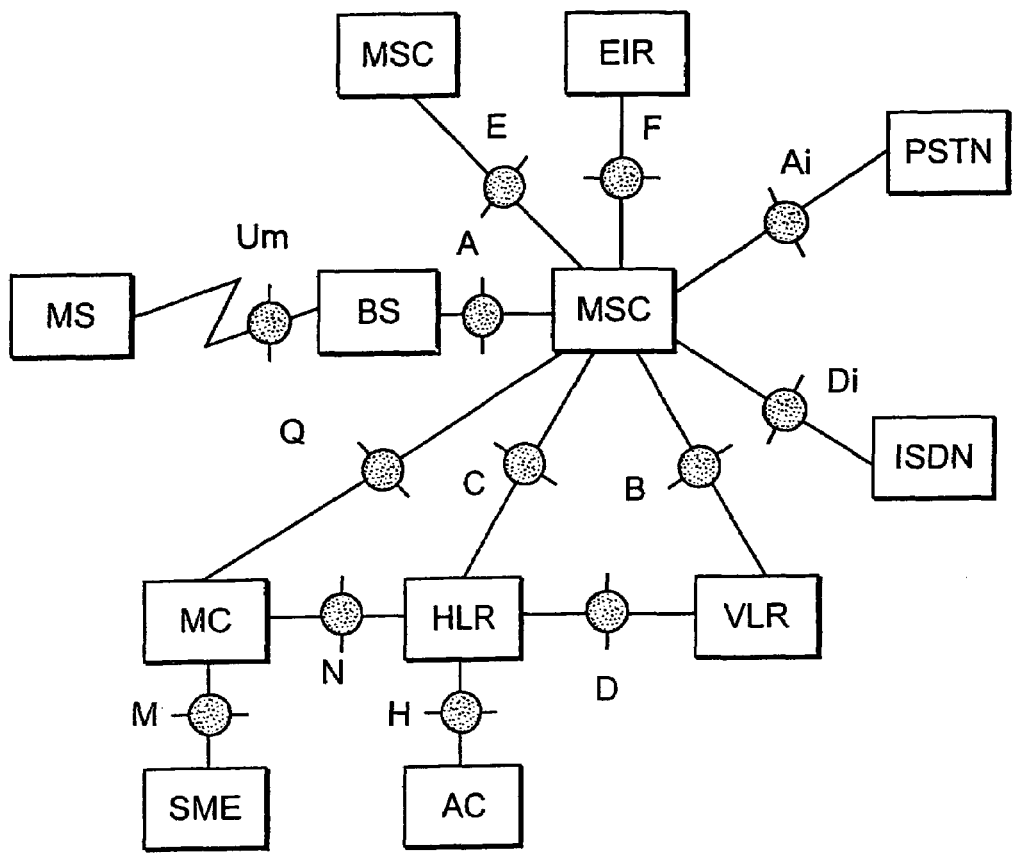
FIG. 3 is a schematic diagram showing the interrelationship of the various components of a cellular system adapted for both voice and data services, of the type known prior to the present invention.

It is to be understood that the figures and descriptions of the present invention have been simplified to illustrate elements that are relevant for a clear understanding of the present invention, while eliminating, for purposes of clarity, many other elements found in a typical telecommunications system and method. Those of ordinary skill in the art will recognize that other elements are desirable and/or required in order to implement the present invention. However, because such elements are well known in the art, and because they do not facilitate a better understanding of the present invention, a discussion of such elements is not provided herein.

According to the present invention, a method, operation, network, and system for delivering wireless communications services is provided. The present invention offers low cost cellular service to a mass market, rather than merely offering service to a limited submarket of relatively price insensitive business users, as is known in the art, for example. The focus of the present invention, thus, may be on historically non-wireless telephone users. Such users may be those who have not yet subscribed to a wireless service, those who are concerned that wireless bills might be expensive and unpredictable, and those users that preferably would use a phone substantially locally to make local calls.

In an embodiment of the present invention, a wireless communication methodology is offered. The present invention may include a high value, fixed price, wireless communication service that may feature a balance of voice quality and capacity for an offering directed to the mass market. Further, the service is offered to a lower cost position. According to an aspect of the present invention, cellular service may be expanded to the mass market as well as additional market segments using capacity utilization, reduced peak system capacity, targeted area coverage, improved capital utilization, additional carrier channels, reduced interconnect costs, improved back office operating efficiency, and/or improved network operating efficiency.

Specifically, the present invention may be targeted to achieve improved subscriber penetration, as discussed further below. In an exemplary embodiment, improved penetration is achieved by focusing on the mass market, rather than a typical limited, subscriber base. As the mobile phone unit price and monthly service fees fall through the use of the present invention, consumer interest in the mass market increases to relatively high levels of penetration that support a viable financial model.

The networks of the present invention may, in an embodiment of the present invention, be deployed as "islands", substantially isolated from sister systems by a geographic area in which service may not be available through the provider. The "islands" of the present invention may be determined based upon market studies. In an embodiment of the present invention, design of the system may be adapted to an island, which island may be based generally, for example, on a demand model, or on the Ranally Trade Area (RMA), and/or on factors such as a local calling area (LCA). A local calling area (LCA) is preferably a geographic area that may be selected in light of projected call activity in a given region, wireline exchanges and/or area codes present in a given area, local calls included in the calling plans of local wireless and wireline carriers, and/or population density in an around an island. The LCA of the present invention may be included exclusively within, or within and without, the island footprint of the present invention. The LCA may be selected on additional factors, such as the cost to the operator of the island to dial exchanges necessitating call flow outside of the footprint. The use of islands allows for capitalization on future technical improvements on a local, regional, and/or national basis, by improving or adding isolated islands, in accordance with the future available technology, without widespread disruption of a larger network.

In an embodiment of the present invention, local and toll calling may be made available to users while those users are physically within the island. Additionally, voice mail and/or long distance service, which may be provided by the offeror or by a party other than the offeror, may be offered while within the island. Long distance may be provided, for example, via an IP protocol, and may be offered over the series of islands within the network of islands. Long distance calls in the present invention may be, for example, routed from the user's phone, to a switch of the present invention, to a dedicated long distance service box. Upon receipt at the service box, the balance in the user's pre-paid long distance account may be checked against the minimum charge necessary to complete the requested call, and, if the user's balance is adequate, the call may then be routed through a long distance service provider. The network of the present invention, which may carry local and/or long distance calling, may be, for example, a "voice over IP" network, and the voice over IP network may operate as a frame relay network. In the frame relay network, market hubs may be connected to regional offices, which are in turn connected to an operation center.

Additional features may be provided in the present invention, such as Short Message Services (SMS), call waiting, call forwarding, call barring, and/or call conferencing, for example. In addition, data products may be available in the form of, for example, financial information, sports information, targeted advertising geographically related to the location of the island, or of the user within the island, stocks, weather, or products delivered to the user based upon a profile of the user, or any other information of interest to the user. These data products may be based on Internet-provided content or content from any other source that is housed within, or linked into, the island, or a secondary network to which the island is communicatively connected. In an embodiment of the present invention, "roaming" may or may not be available to a user that departs physically from the island in which that user has service, and the design of the islands of the present invention thus may be performed without regard to roaming features and limitations. Nonetheless, exchange services may be offered between networks of the present invention on a regional or national basis.

In an embodiment of the present invention, the islands of the present invention are designed for capacity, rather than geographic coverage, because geographic coverage may be limited to within each island in any event. In light of the use of capacity as a principal design constraint, coverage is preferably provided primarily in the areas where the users substantially live, work, play, shop, go to school, and undertake most day-to-day activities, as well as the principal corridors between those locations, and improved in-building coverage at those locations. By designing for capacity, rather than coverage, the number of cells may be reduced, without deploying substantial numbers of microcells, as discussed further below. Further, sites may be preferably located in the highest density at locations where the greatest capacity needs exist.

A "demand model" is a factor for inclusion in the design of a capacity-based island. The demand model preferably includes the percentage of users falling into each market segment, as set forth herein, and may additionally be broken down into the percentage within a given segment that is at home, at work, shopping, playing, driving, and the like, at a given time. The demand model may, for example, include data taken from census blocks, which census blocks provide information on groups of people and allow for an estimation of where and when those people live, work, play, drive, shop, and the like (alternatively referred to herein throughout as "live, work, and play"). A data base of census blocks, and/or similar information, may be mined, by census block, and the percentage of each market segment in that census block, and the percentage of each segment undertaking a given activity per unit time in the census block, may thereby be determined by various methodologies that will be apparent to those skilled in the art. The possible covered population may then be determined, and a percentage-of-use estimate per unit time, and a penetration goal, may then be generated for each market segment, using calculations apparent to those skilled in the art, thereby allowing for a determination of the average and peak load usage for each segment and in each census block.

Table 4, below, illustrates the population by user segment for an exemplary installation.

TABLE 4

Population by User Segment

| Segment | Number | Percentage | Breakdown |
|---|---|---|---|
| Teens | 23,601 | 4.30% | Ages 15-17 |
| College Students | 30,724 | 5.60% | Ages 18-21 |
| Spouse | 65,086 | 11.85% | ½ of Married People >35 yrs. Old |
| New Wage Earner | 92,890 | 16.92% | Ages 22-34 |
| Blue Collar | 96,450 | 17.57% | Ages 35-64 with House Hold income <$75K |
| Other | 240,291 | 43.77% | Ages 0-14 (108,697) Retired $\geq$; 65 (77,997) Ages 35-64 with income $\geq$$75K (23,452) Ages 35-64 with Roommate (30,145) |
| Total | 549,042 | 100.00% | |

In an exemplary embodiment, and in order to complete the demand model, research regarding where people live, work, drive, play and/or shop may be performed by reviewing various additional criteria. For example, research may be undertaken to locate new housing developments, the number of people that may live in those developments, the location of those developments with regard to access points such as highways, the addition of significant new employers to the region, the location of those employers, updates to traffic patterns, traffic volume expected due to those updates, the addition of new recreational areas, and the locations of not only additional cell sites of other wireless providers, but also retail locations of other wireless providers. Research regarding these topics may be performed, for example, by a review of records at the Chamber of Commerce, by review of the telephone book, via local economic development centers, via local business newspaper sections, via real estate sections, via departments of transportation, via education institutions, and/or via survey of actual population activities.

Figure 11:
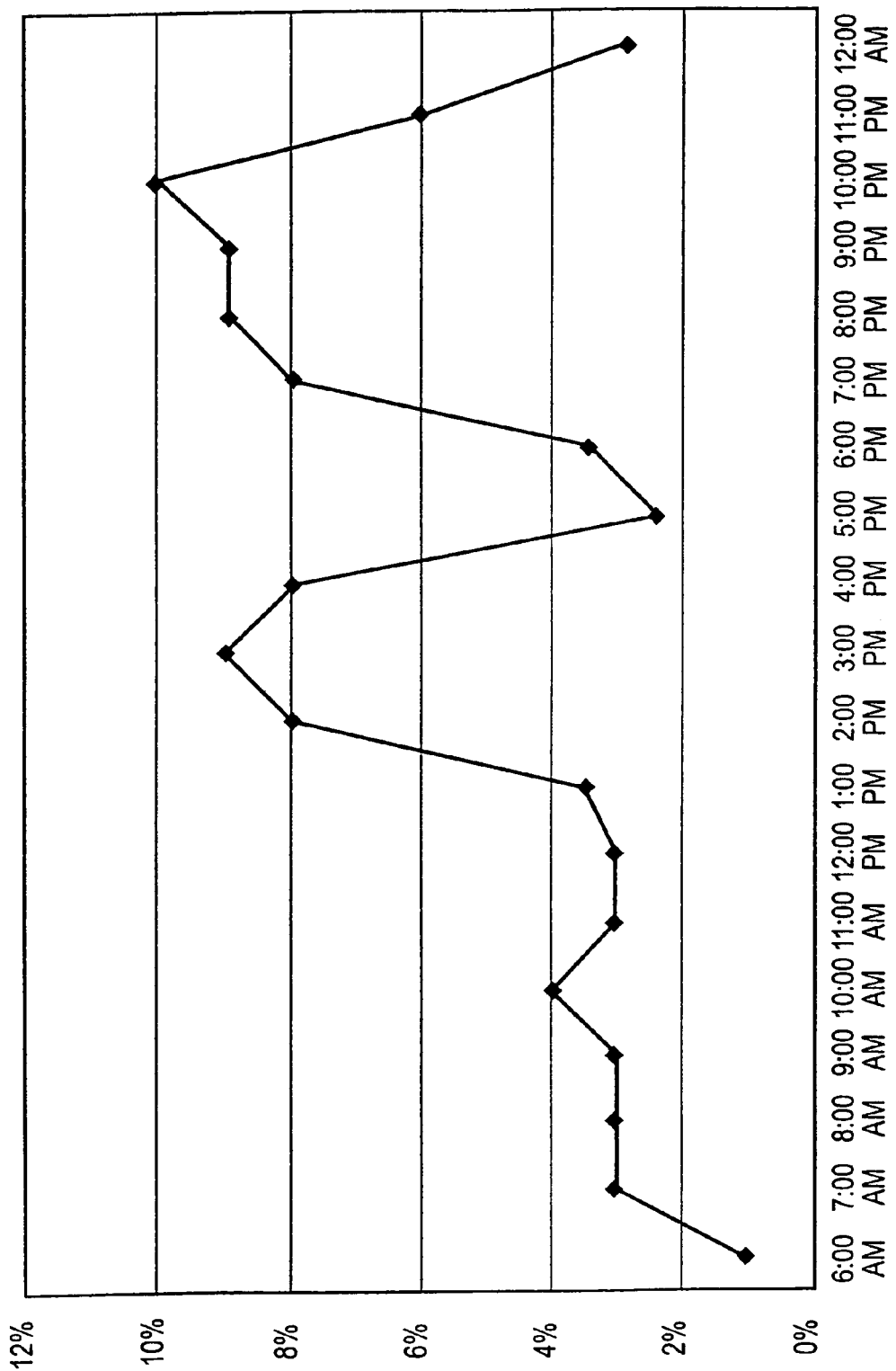
FIG. 11 is a graph of the usage distribution for the teen segment.
Figure 12:
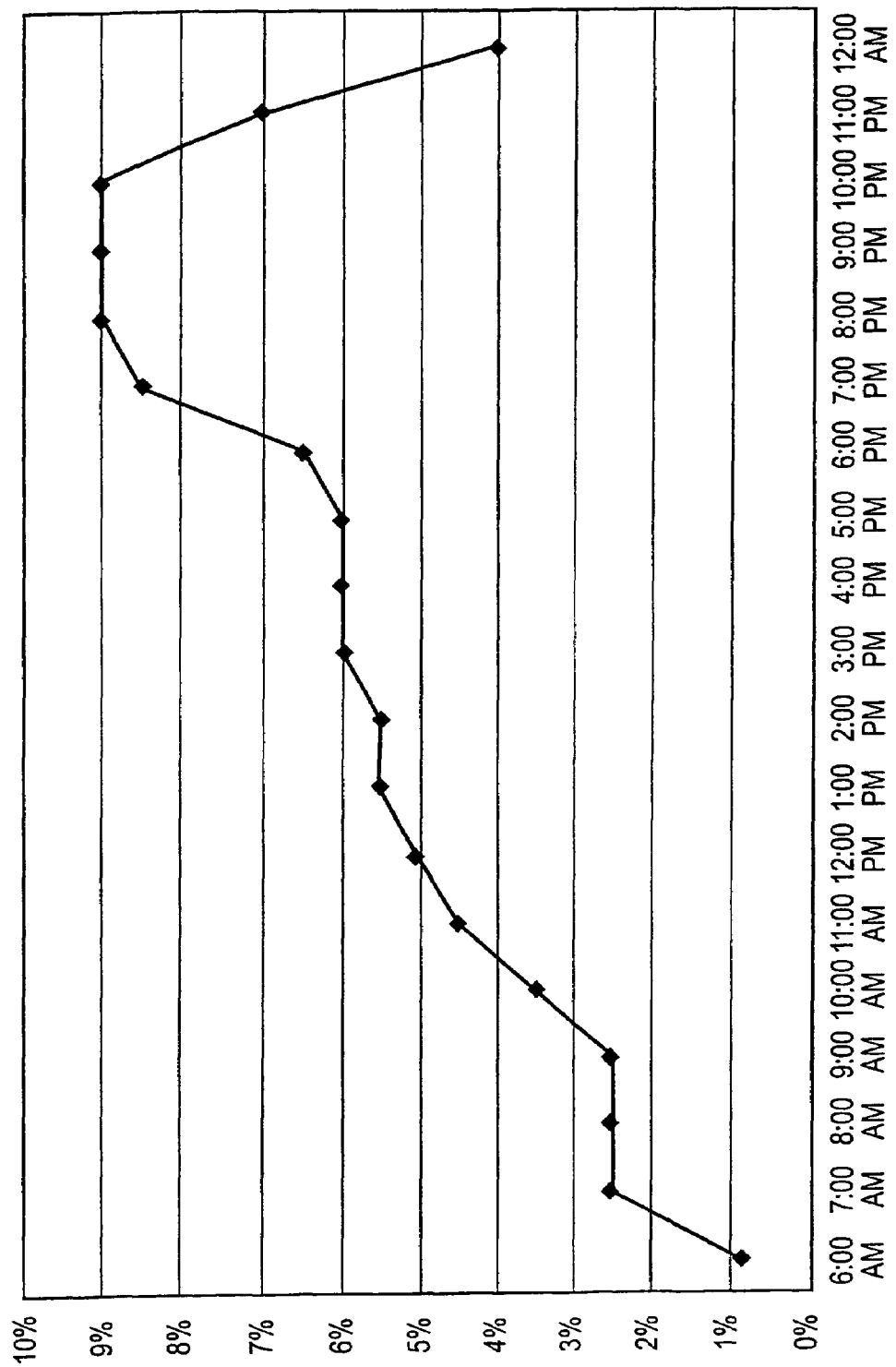
FIG. 12 is a graph of the usage distribution for the college student segment.
Figure 13:
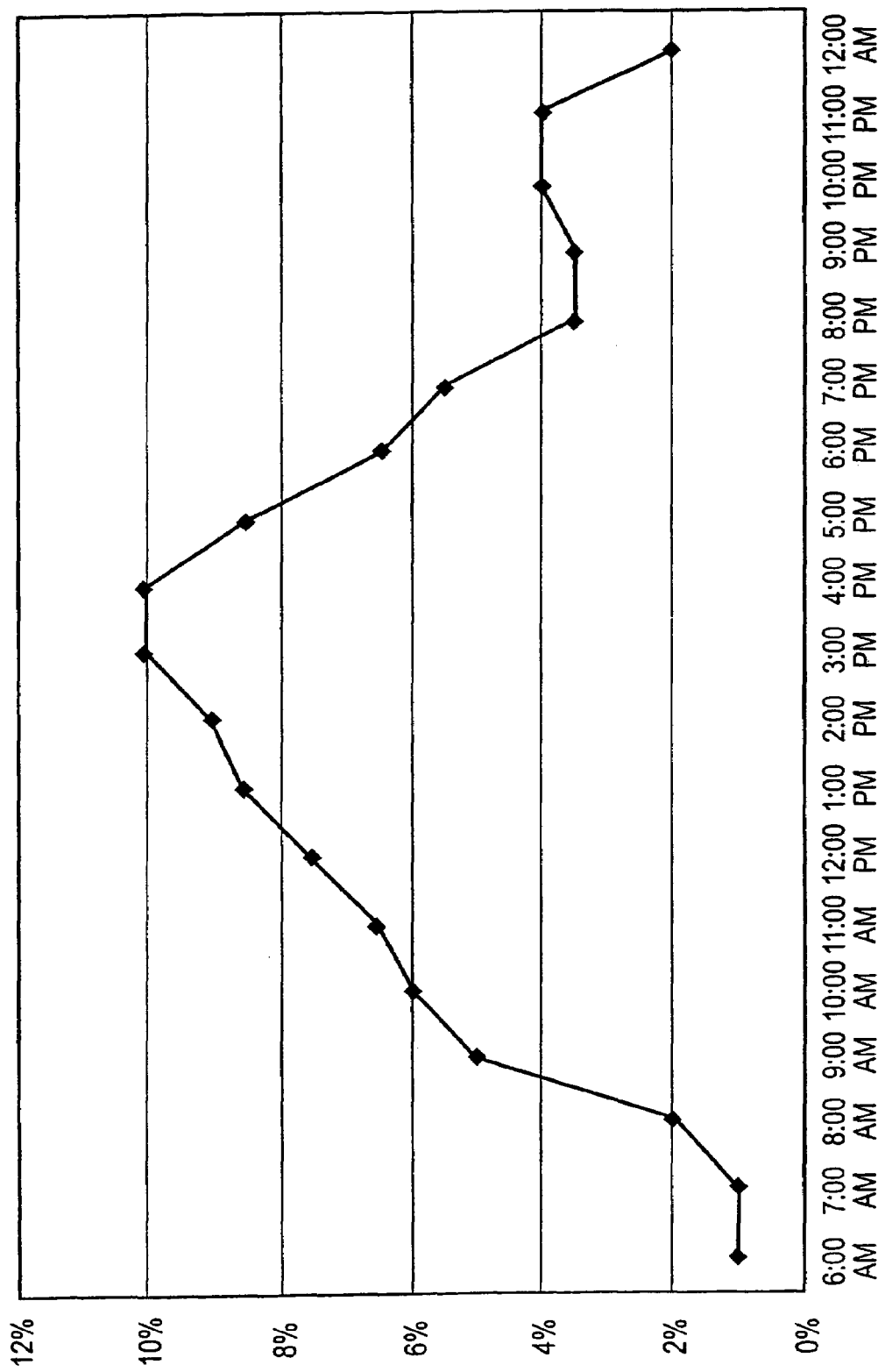
FIG. 13 is a graph of the usage distribution for the secondary income spouse segment.
Figure 14:
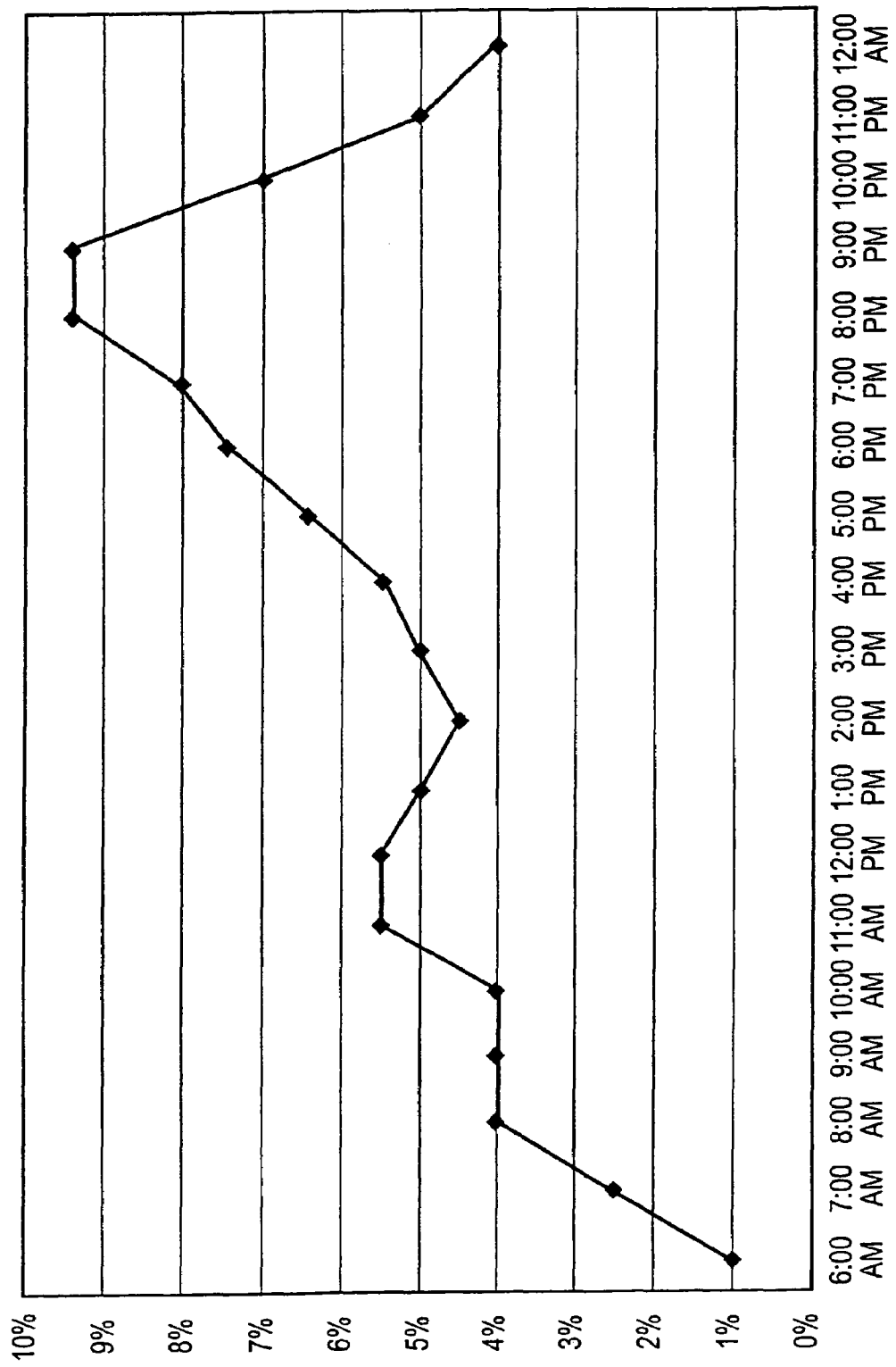
FIG. 14 is a graph of the usage distribution for the new wage earner segment.
Figure 15:
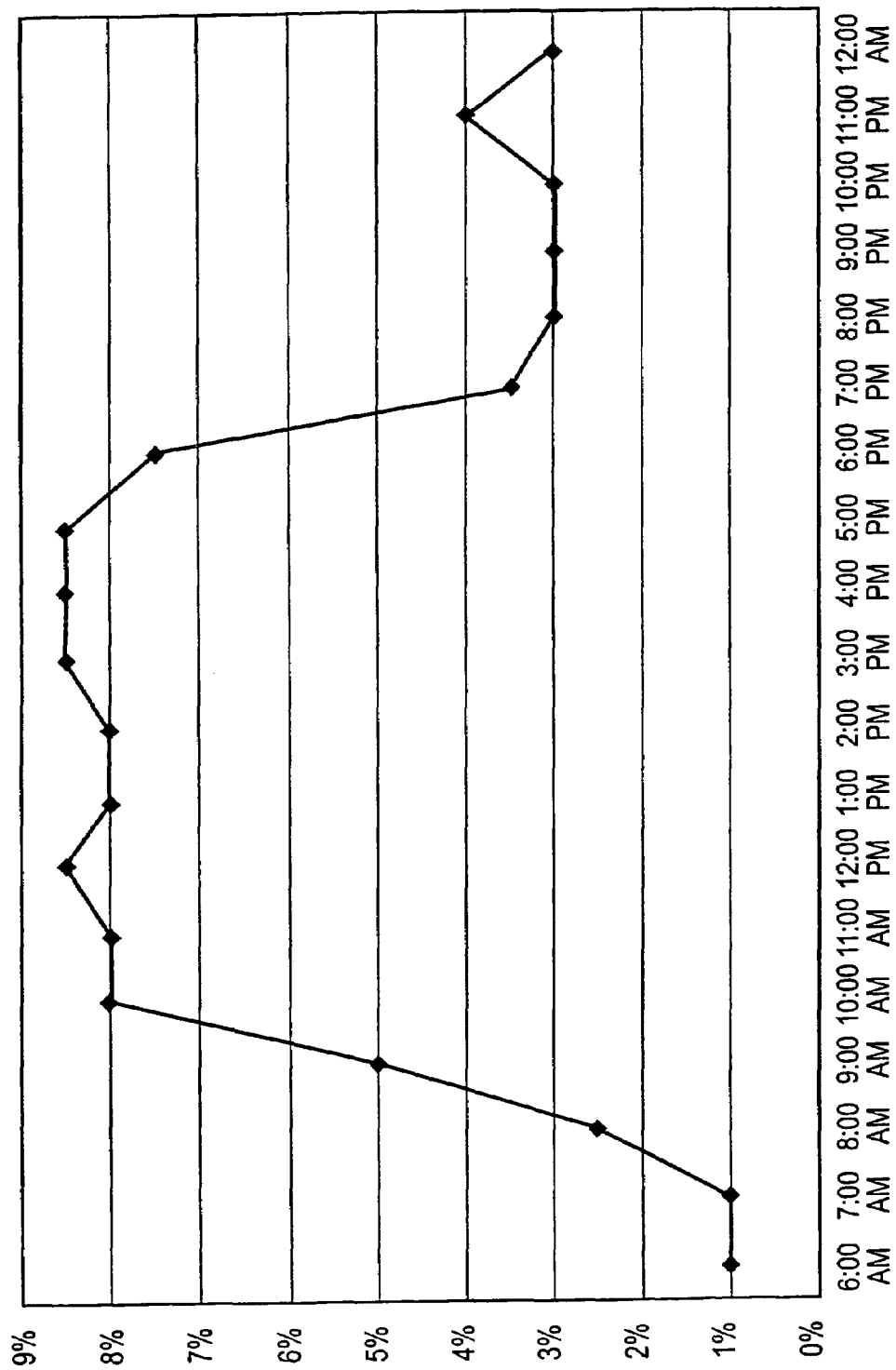
FIG. 15 is a graph of the usage distribution for the blue collar segment.
Figure 16:
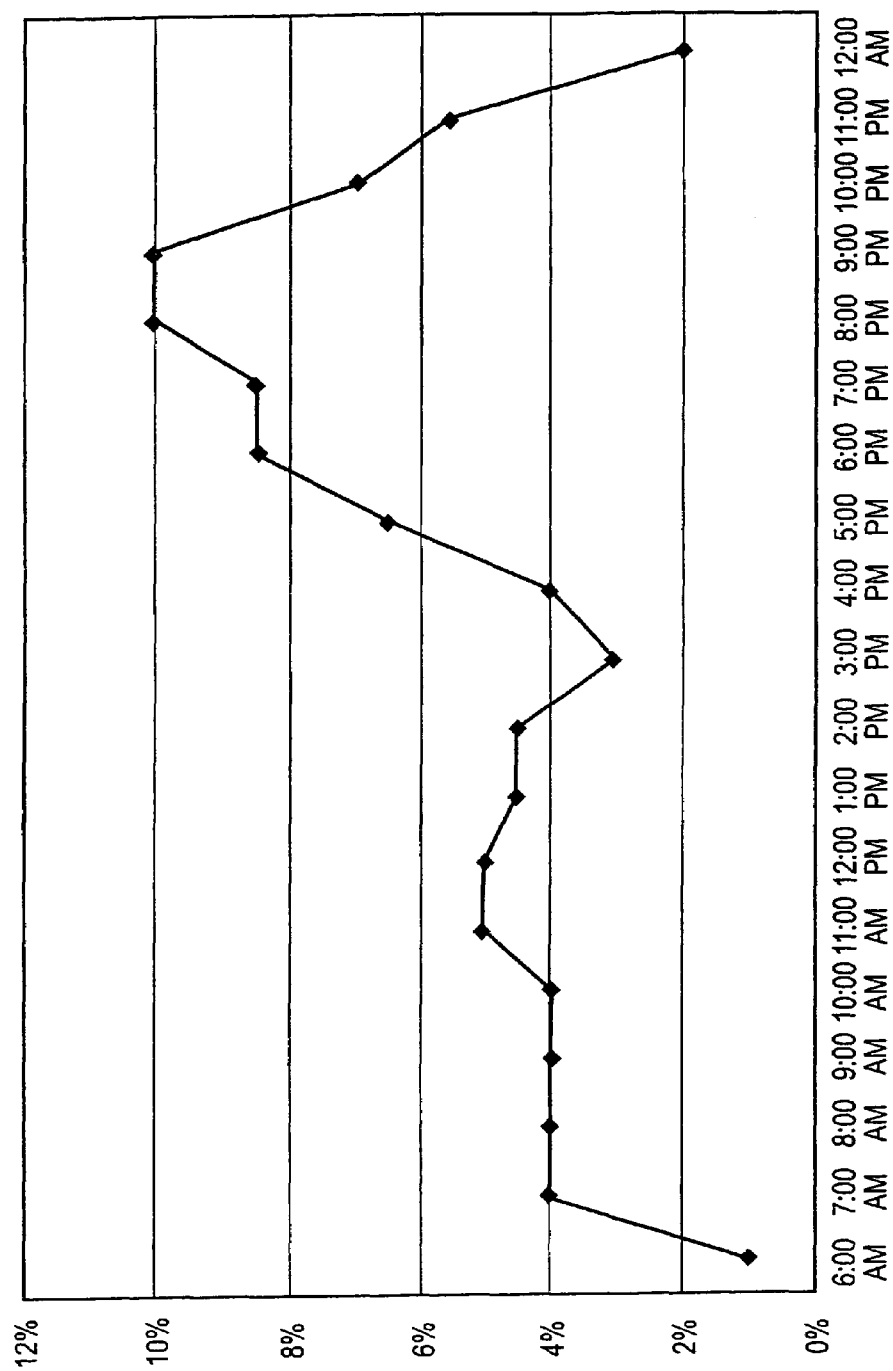
FIG. 16 is a graph of the usage distribution for other users.
Figure 17:
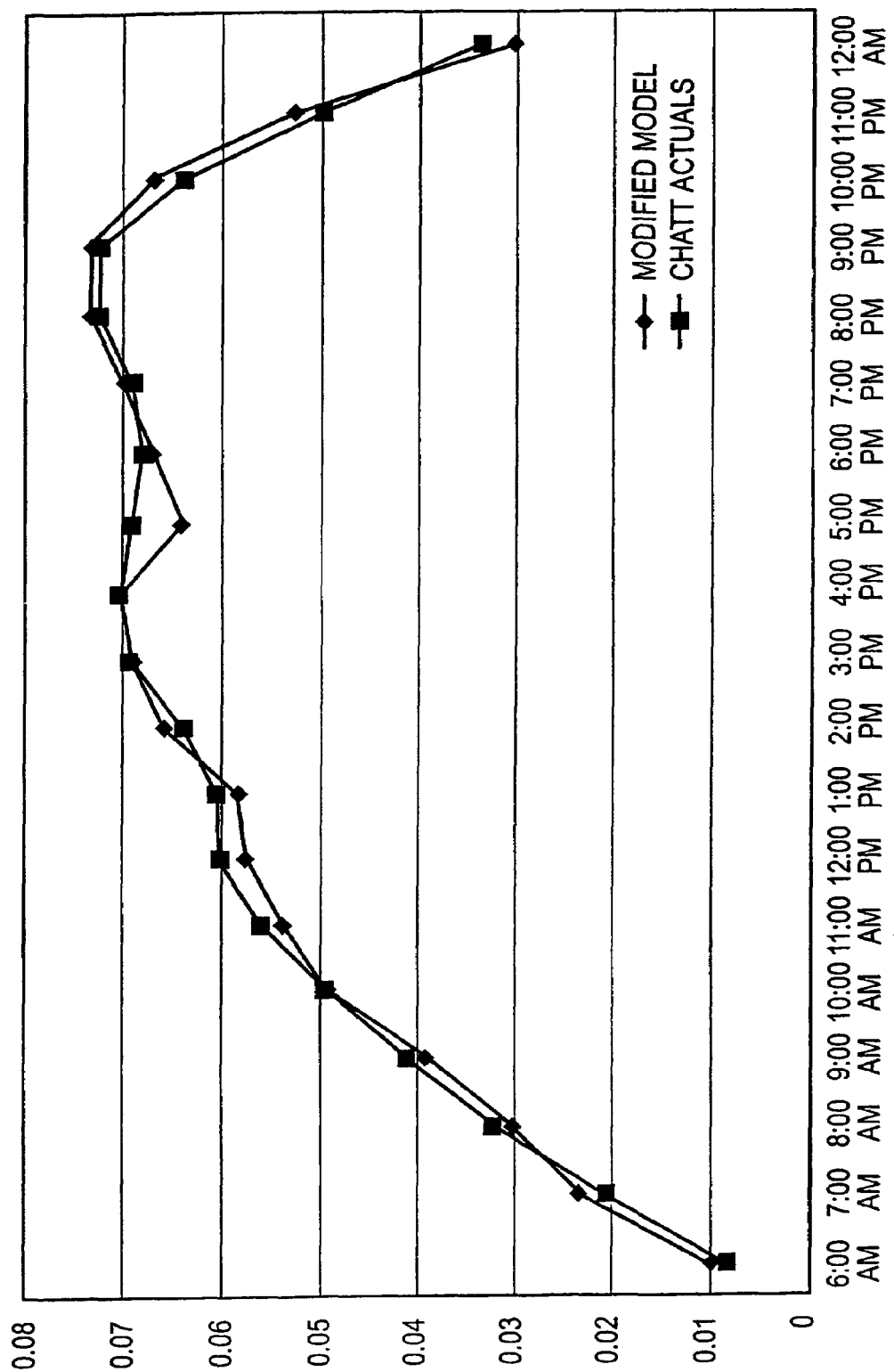
FIG. 17 is a graph of the usage distribution for users comparing predicted data with the actual data.
Figure 20A:
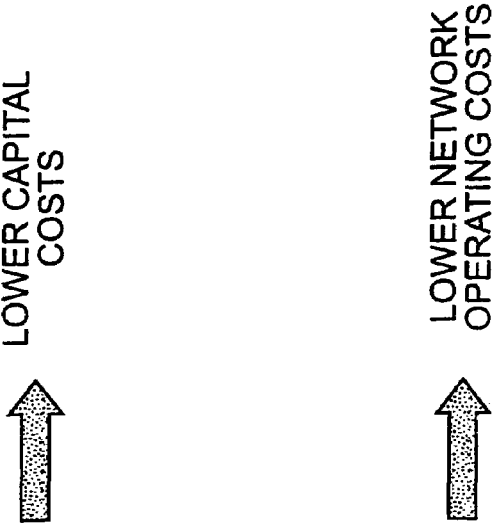
FIG. 20a is a chart illustrating the re-engineering of the cost structure of a wireless system according to the present invention.
Figure 20B:
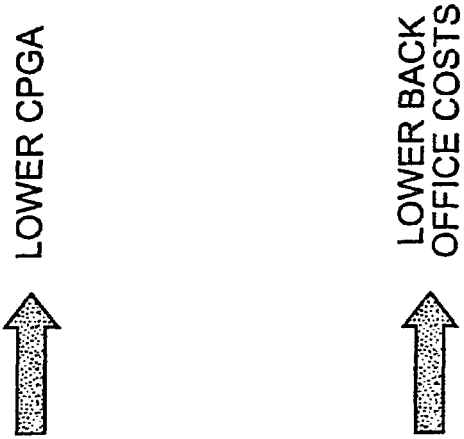
FIG. 20b is a chart illustrating the re-engineering of the cost structure of a wireless system according to the present invention.

In accordance with this research, FIG. 11 illustrates projected use, by the teen market segment, of the present invention. As illustrated in FIG. 11, the peak usage is between approximately 3 pm and 5 pm. FIG. 12 illustrates the usage of the college student segment. The users in this segment tend to awaken later in the morning than other users, and typically stay up later at night than other segments. Accordingly, phone use reflects this pattern. As illustrated in FIG. 12, the peak usage is between approximately 4 pm and 8 pm. FIG. 13 illustrates the usage of the segment represented by secondary income spouses. The primary usage in this segment occurs while children are in school between the hours of 8 AM and 2 PM. FIG. 14 illustrates the usage by new wage earners, such as young professionals. As illustrated in FIG. 14, the peak usage is between 4 pm and 8 pm. FIG. 15 illustrates the usage by blue collar workers. As illustrated in FIG. 15, the peak usage is between 3 pm and 8 pm. FIG. 16 illustrates the usage of a mix of people, the usage of which is spread across the day, with heavier usage during the noon and evening hours.

Further, competitive intelligence may be employed as a factor in the generation of the islands in the present invention. For example, the locations of competitive sites may be assessed. If the carrier handling the competitive site is not known, the location of the site may simply be noted as a preferred location for a site in the system of the present invention. Competitive sites may be noted on a large scale market map, such as for weighting and inclusion with other factors for island design as set forth herein below.

Other factors that may contribute to the capacity-based design include not only the demand model, such as the detailed demographics and census block demographics of potential market segments, including teenagers, students, secondary wage earners, and blue collar workers, and the competitive intelligence, but also vector based vehicle traffic counts, and hot spot locations—e.g. areas where heavy call volume is anticipated—where, such as malls, convention centers, sporting venues, major highway merges, probable store locations for the system operator, transportation centers, such as airports and train and bus stations, or recreational areas. The geographic design of the island, for the purposes of insuring limited interference, ability to obtain permits, desired demographic profiles, and adequate locations for the placement of cell sites, may include, for example, the demographic information set forth herein above, as well as digital elevation maps, "night light" maps, cluster maps, which may include market appropriate data, topographic maps, road maps, and, for example, political boundary maps.

An additional factor that may contribute to the capacity-based island design may be the existence of multi-market service opportunities. Multi-market service may be available where multiple islands are selected by the operator to be available to the same user, dependent upon in which island the user is present. For example, if a given user is located in island 1 in month one, and the user will be located in island 2 in month two, the user may be allowed to change service, for, for example, a given fee, between islands 1 and 2 as necessary. Additionally, where a user is registered in an island that is sufficiently close to an adjacent island, that user may, for a fee or for no charge, have the ability to operate the phone in either of the two adjacent islands, and may, additionally, have service extended between the two islands, such as by creation of a third island or by allowing a limited "roaming" feature, such as to the extent that the service area between the two islands covers only a small geographic area. Further, an extended calling area (ECA) feature may be available, wherein, for a fee, the free calling area for a given user may be extended, such as to one or more additional participating islands, and may thereby include the local calling area of an adjacent participating island.

Thus, the design of an island in the present invention may include, for example a weighted comparison of the demand model, a "hot spot" map for a local area, competitive intelligence, a local calling area map, which includes the exchanges available to a caller within the island as local calls, a co-location site map, and/or a map of potential multi-market service opportunities. This weighted comparison allows for a generation of estimated average and/or peak capacity in each segment of the island by calculation methodologies apparent to those skilled in the art, which weighted comparison allows for an estimation of necessary locations for cell sites in order to achieve the desired capacity at each cell site segment, and the desired Erlang (defined herein as cumulative capital expenditure per unit usage) measure based upon the calculated capacity. The weights assigned to each of the factors will be apparent to those skilled in the art, and will be a function of the desired profitability model employed. In an exemplary embodiment of the present invention, the predicted locations at which people will live, work and play at given times of day may be weighted to predetermine peak capacity in each island and/or island segment, and consequently to predetermine cell site placement necessary within the island. Hot spot, night light, and demographic maps may be weighted to assess the ability to place cell sites at the locations necessary to meet the peak capacity, and may be assigned weights for capacity based on actual capacity contribution, or based on limitations on capacity in a given area, i.e. may be weighted as a "negative" factor on capacity. The local calling area may be weighted as a capacity value, or may be weighted to provide an exterior limitation on the outer boundary of the island that will allow the island to provide a profitable service island in light of the necessary capacity, and in light of the fees, real estate, and the like necessary to place cell sites in light of the peak capacity design, i.e. may be weighted as a "negative" factor on capacity. In order to perform this calculation, each factor is preferably converted to a capacity value, each capacity value is then multiplied by its predetermined factor weighting, and the result is generated in terms of system capacity and Erlangs (defined herein as cumulative capital expenditure per unit usage) for each island and/or island segment for which the calculation is performed.

The maps shown in FIGS. 8 and 9 illustrate a comparison of exemplary coverage patterns of the conventional art and the present invention, respectively. It will be apparent from FIG. 9 that the footprint of the island is modified relative to conventional cellular systems. Specifically, the coverage footprint of the present intention may be the function of density, competition, and locations and attractions where users live, work and play within the island service area set forth herein above. The system of the present invention is adapted to provide high capacity in the footprint areas, at the expense of low usage portions of prior known cellular networks where capacity may have been maintained for roaming use.

The "capacity" vs. "coverage" feature of the present invention may be implemented using one or more of various design criteria, including adding cells in downtown areas, redesigning networks to focus on traffic patterns, modification of equipment, modifying the geographic extent of coverage, or altering the amount of traffic various cells are carrying in the system, such as by load balancing, as discussed herein below.

New telephonic technology may be employed to improve capacity, such as Enhanced Variable Rate Code (EVRC) technology, and "Smart Rate" technology, and which employs improved data rates to thereby allow for increased site capacity. The use of a number of EVRC phones, rather than exclusive use of a 13 kBit per second phone, in conjunction, for example, with the use of a second carrier, may provide for the drop in blocked calls noted in FIG. 10*a*. Further, in an embodiment of the present invention, system users in the top 5%, for example, of system use may preferably be selected to first obtain technology advancements that will allow for improvements in system capacity, such as EVRC phones. For example, a conventional system may currently operate at 0.025 Erlangs, while the network of the present invention, incorporating, for example, EVRC phone switch outs and second carrier capabilities, has been shown to operate at 0.055 Erlangs. Additionally, 1XRTT phones may be employed to replace EVRC phones, which might, for example, increase capacity approximately an additional 7 to 8%.

In an embodiment of the present invention, the present invention may employ, for example, CDMAone technology. Reference to CDMA herein is by way of example, and should be construed to include interchangeable technologies that will be apparent to those skilled in the art as appropriate for use in the present invention, including, but not limited to, CDMA, FDMA, TDMA, GSM, and other and subsequently arising substantially similar protocols. The equipment deployed at a cell site, such as in a CDMA one system, preferably allows for the addition of a second carrier signal as set forth herein above, and may allow for the addition of a third and/or additional carrier signal, in order to improve capacity. In an embodiment of the present invention, the second or additional carrier may selectively be added at locations of highest capacity need. It will be apparent to those skilled in the art that particular block types in a CDMA system operate at particular bandwidths, and additionally operate in different frequency ranges, thereby allowing for these varying numbers of carriers. Further, antennae deployed in a CDMA or GSM system of the present invention having larger beam width or less down tilt may provide improved coverage in areas that do not present a significant difficulty with capacity or interference, in light of the capacity based design set forth herein above. However, for rural sites, higher gains and smaller beam widths may be necessary to extend coverage along, for example, the highways in a rural area. In an embodiment of the present invention, inclusion of rural areas in the islands of the present invention may preferably be avoided.

In an embodiment of the invention employing, for example, CDMA, the variable quantities and settings associated with the implementation of the present invention may be varied to obtain a desired coverage and capacity at each cell site, and at each sector within each cell site, and the techniques by which those quantities and settings are so varied is herein referred to as "load balancing". The per-site load balance for a three-sectored cell site may preferably be a maximum ratio of 25/25/50 per sector for each of the three sectors of each three-sectored cell site, in order to provide even distribution of traffic. It will be apparent to those skilled in the art that six-sectored sites may also be employed in the present invention The maximum capacity desirable for each sector is preferably, for example, about 17.5 Erlangs per carrier at 57% of the maximum loading for that sector. The second carrier overlay is preferably applied for sites whereon a sector captures more than approximately 57% of loading. In order to prevent overloading of multiple sectors in a given site or sites, the present invention may employ a greater number of cell sites within an island than a conventional network might employ in the same geographic area, due to the fact that users of the present invention, due to the flat fee charges, may make use of the present invention to a greater degree than users of conventional systems.

Load balancing may be performed in an embodiment of the present invention in order to avoid the addition of extra equipment within the island. Load balancing includes the varying of transmission power to balance the load between cell sites. CDMA technology provides an ability to load balance on a per-site basis, but the present invention provides an ability to balance load on an island-wide basis, such as through a simultaneous communication between multiple sites within the island, and an automated load adjustment in accordance with the results of this simultaneous communication. The coverage area for particular cell sites may be changed by varying the power of a given site in light of the load on that site and the surrounding sites. For example, if site one was loaded to a maximum level, sites two and three might be subjected to an increase in power in order to take a portion of the load from site one. This may be done, for example, by down turning the antenna, thereby varying the forward link power of the particular sites. Smart antenna might be employed to perform this load balancing automatically, in an embodiment wherein the power and load of each segment of each cell site was tracked, and wherein the antenna power was automatically adjusted in order to compensate for un-balanced loading. Additionally, load may be made further available by adding additional sites, such as in areas where sites historically could not be or had not been placed, or by improving or varying power output of current sites. For example additional smaller sites, such as in highly populated areas, might be made available through the use of remotable fiber towers, such as those made by Ericcson and/or Lucent. These smaller sites may be placed in an increased density pattern, or may be placed in areas in which larger sites could not be located, such as heavily residential neighborhoods. In an exemplary embodiment of the present invention, the load balance may be adjusted at implementation of the present invention, and/or at a predetermined time interval following implementation of the present invention, such as 2 months following the implementation, in order to allow for an accumulation of load balance data regarding the operability of the present invention.

In order to increase capacity in the present invention, the Frame Error Rate may be relaxed. Traditional operators maintain a Frame Error Rate of about 1%. In the present invention, the Frame Error Rate ("FER") may be relaxed to about 2%, or 3%, or higher, thereby increasing system capacity, without significant degradation of signal quality and quality of service in the limited geographic area. The FER set point defines voice quality, and in the conventional art, it is generally accepted to set the FER set point at 1% as set forth hereinabove. However, in the present invention, for example, it will be apparent to those skilled in the art, that a 1% change in FER from 1% to 2% may provide for as much as a about 15% gain capacity. Further, it is possible to automatically change the FER setting as necessary, when improved capacity becomes needed. For example, in the instance wherein capacity exceeds the maximum levels available, such as in the event of a major disaster, it is likely that users would prefer to have service of lowered quality than to have no service. In such an instance, the FER may be automatically raised to 2% or higher, in order to provide the necessary capacity. Before and following the need for the increased capacity, the system may be automatically adjusted for maximum voice quality and lower capacity. It should be noted that adjustment of the FER varies the power of the data stream, rather than varying the data rate.

In order to further improve capacity, the link budget of the present invention reflects the capacity-based and improved in-building coverage design. The link budget is defined herein as the link power between sites and/or sectors, and a large number of factors contribute to calculation of the link budget. In an embodiment of the present invention, the Energy per Bit to Noise (EB/NO) may, for example, equal 5.5 db. The coverage design conditions of the present invention entail the use of a higher decibel level than in prior known systems to allow for the in-home design coverage condition to be about, for example, 12-15 db, and the in-building coverage to be about, for example, 18 db, while preferably maintaining the Erlang level per square mile at 0.03E or higher.

According to an aspect of the present invention, and by virtue of the designing of the network of the present invention in accordance with capacity, and thereby in accordance with a lower maximum peak use than in the conventional art, as discussed herein, an operator employing the present invention may reduce the total number of cells in the system. This employs less expensive capital equipment and improves the efficiency of maintenance and repair activities, as fewer cells are used and distance for traveling to the outlying cells is reduced. As fewer cells are built into the system, lease costs are reduced for cell towers and cell sites. In a preferred embodiment, islands may be selected in which the network of the present invention may be employed for one cent or less per unit of usage, for example. Further, the present invention may elect to allow for holes in coverage area, rather than employ towers that will not be used to sufficient capacity to support profitable operation of the island and/or portion of the island.

Table 5 provides some approximations of the capacity, in terms of simultaneous calls per sector/carrier for various telephony applications. It will be evident to those of skill in the art from Table 5 that the capacity advantages currently available through a wireline or Wireless Local. Loop (WILL) telephony system are available through the use of the present invention.

TABLE 5

Simultaneous Calls Per Sector
Carrier Capacity By Application

| Application | Present | Future |
|---|---|---|
| Mobile | 15 | 18 |
| Mixed | 19-20 | 23-24 |
| Fixed | 24 | 28 |
| Present Invention | 19 | 19-28 |

The capacity of the CDMA air interface employed in the present invention and illustrated in Table 5 has evolved from the IS-95A Standard (19 calls per sector) in 1998 to the IS-95B Standard (22 calls per sector) to the current IS-95C Standard (39 calls per sector).

Figure 6:
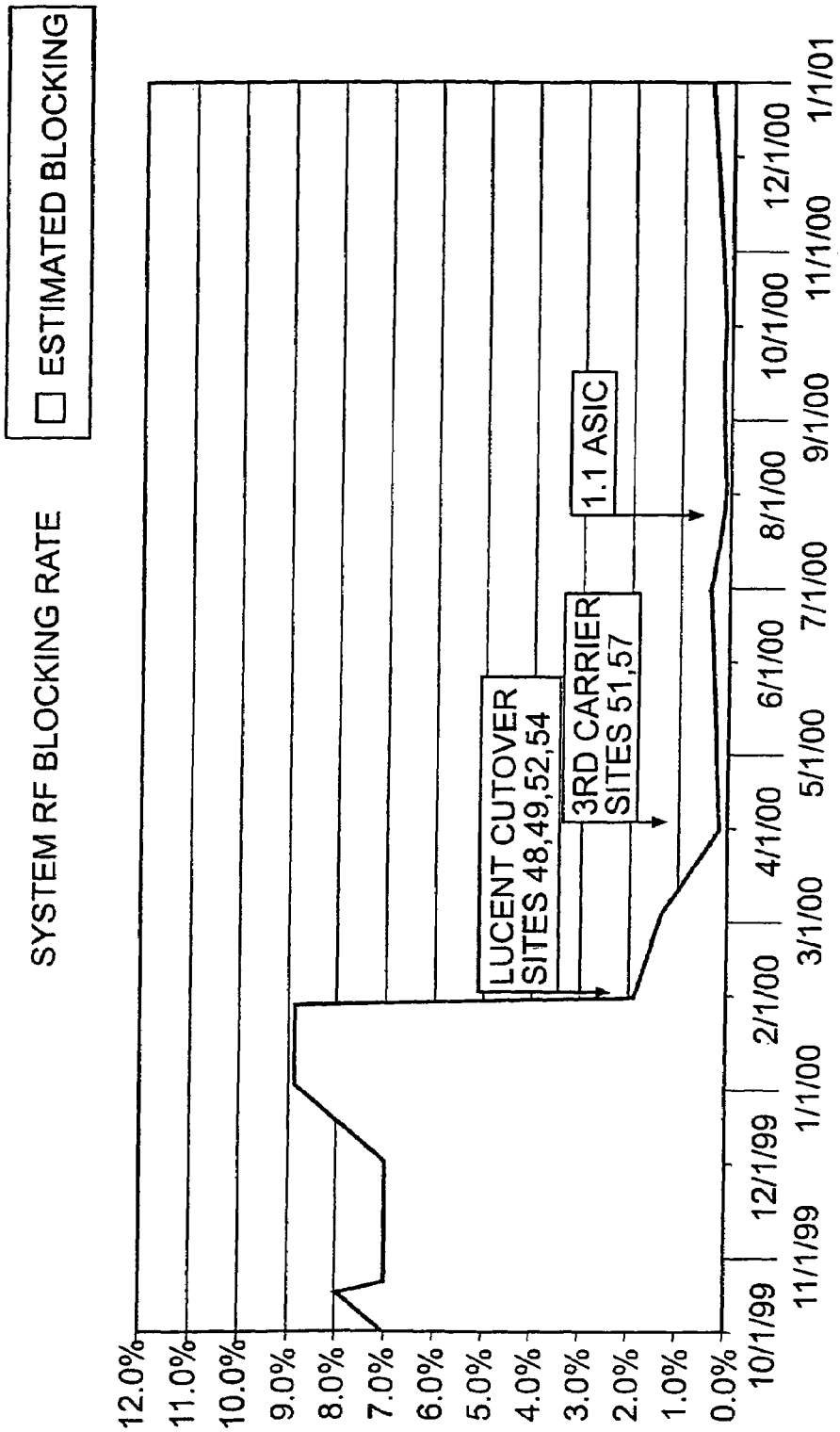
FIG. 6 is a graph depicting the predicted change in System RF Blocking Rate upon conversion of a system of the according to the present invention.
Figure 7:
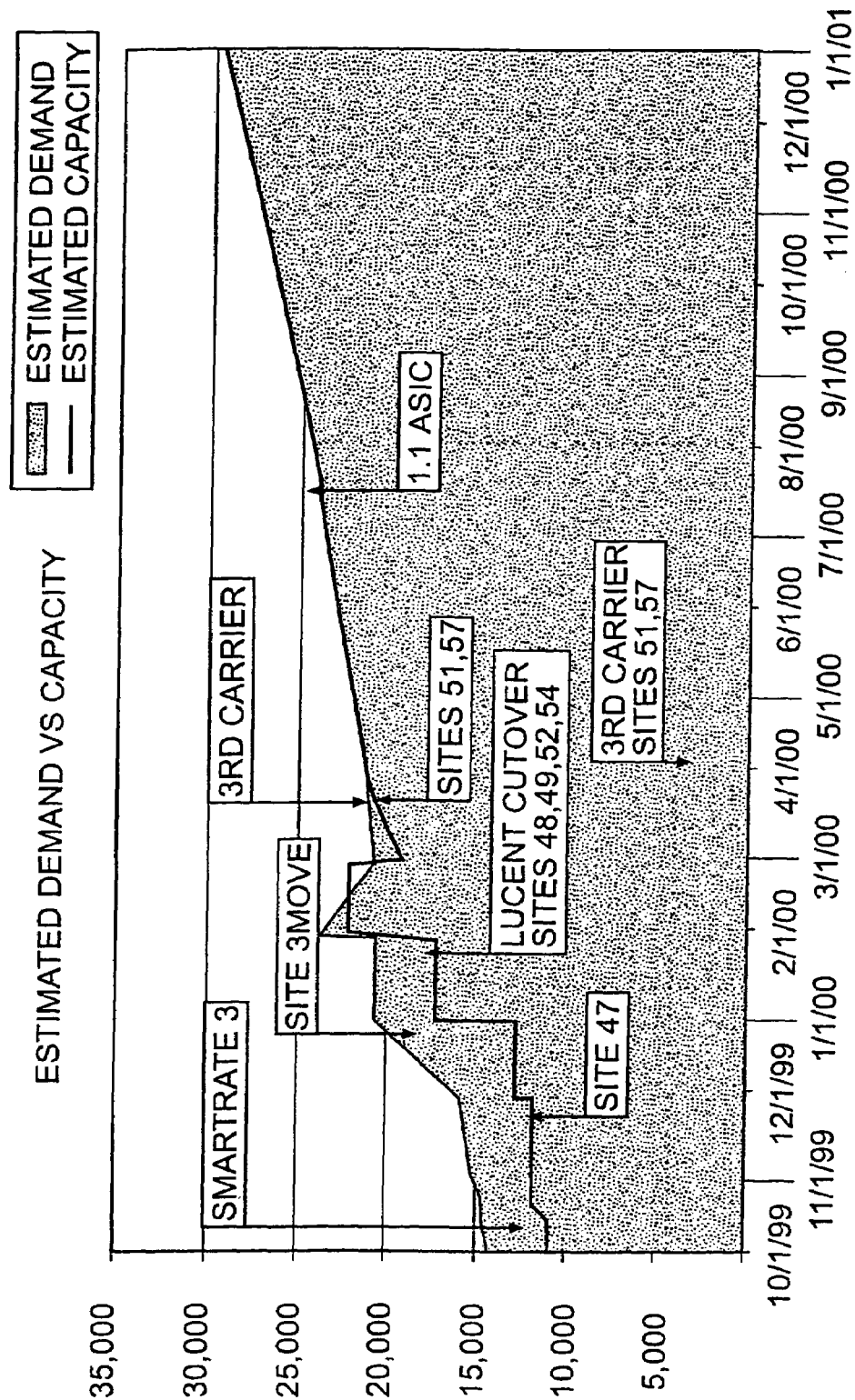
FIG. 7 is a graph of estimated demand vs. capacity upon conversion to a system according to the present invention.
Figure 8A:
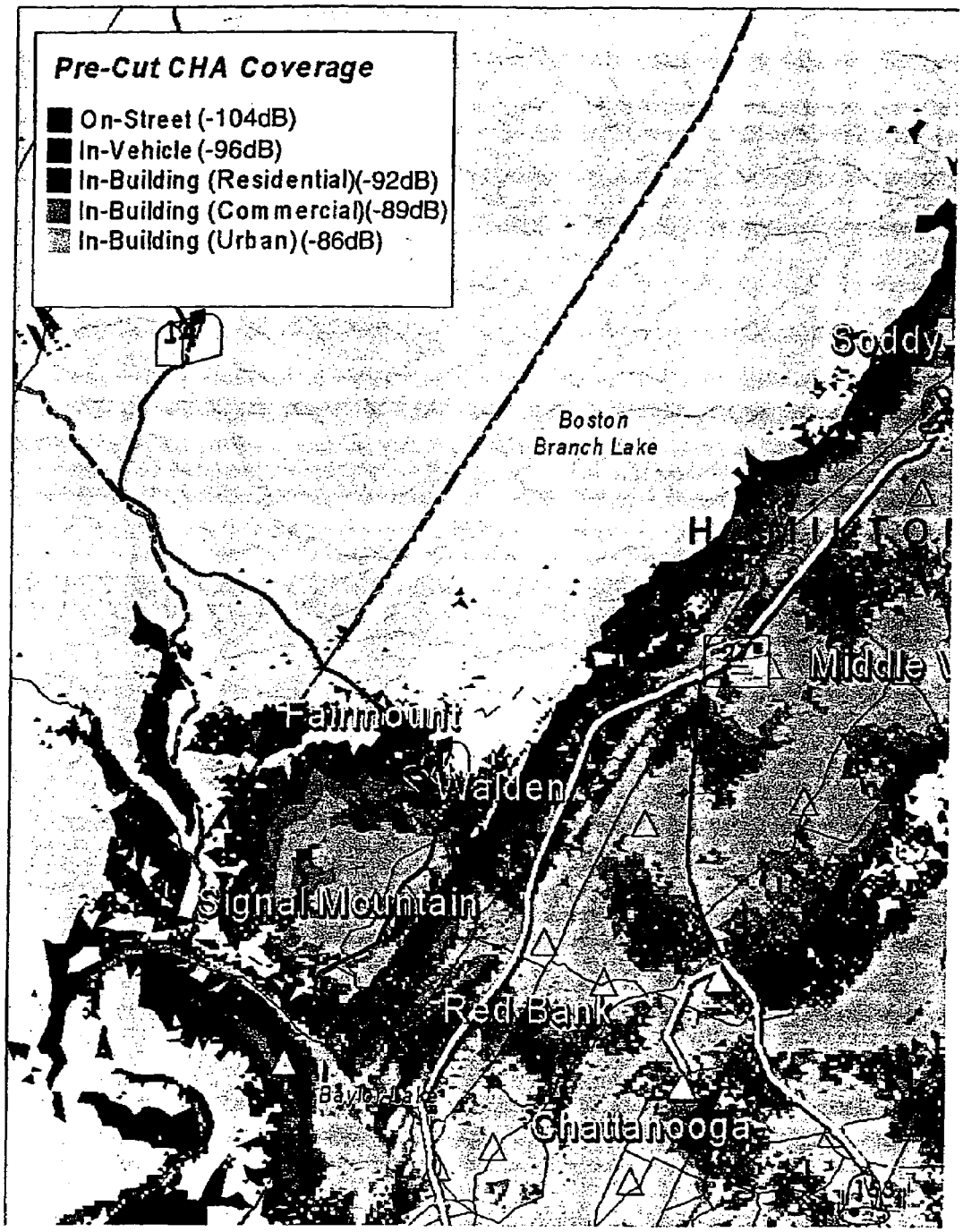
FIG. 8 is a map depicting system coverage of a cellular system prior to implementation of a system according to the present invention.
Figure 8B:
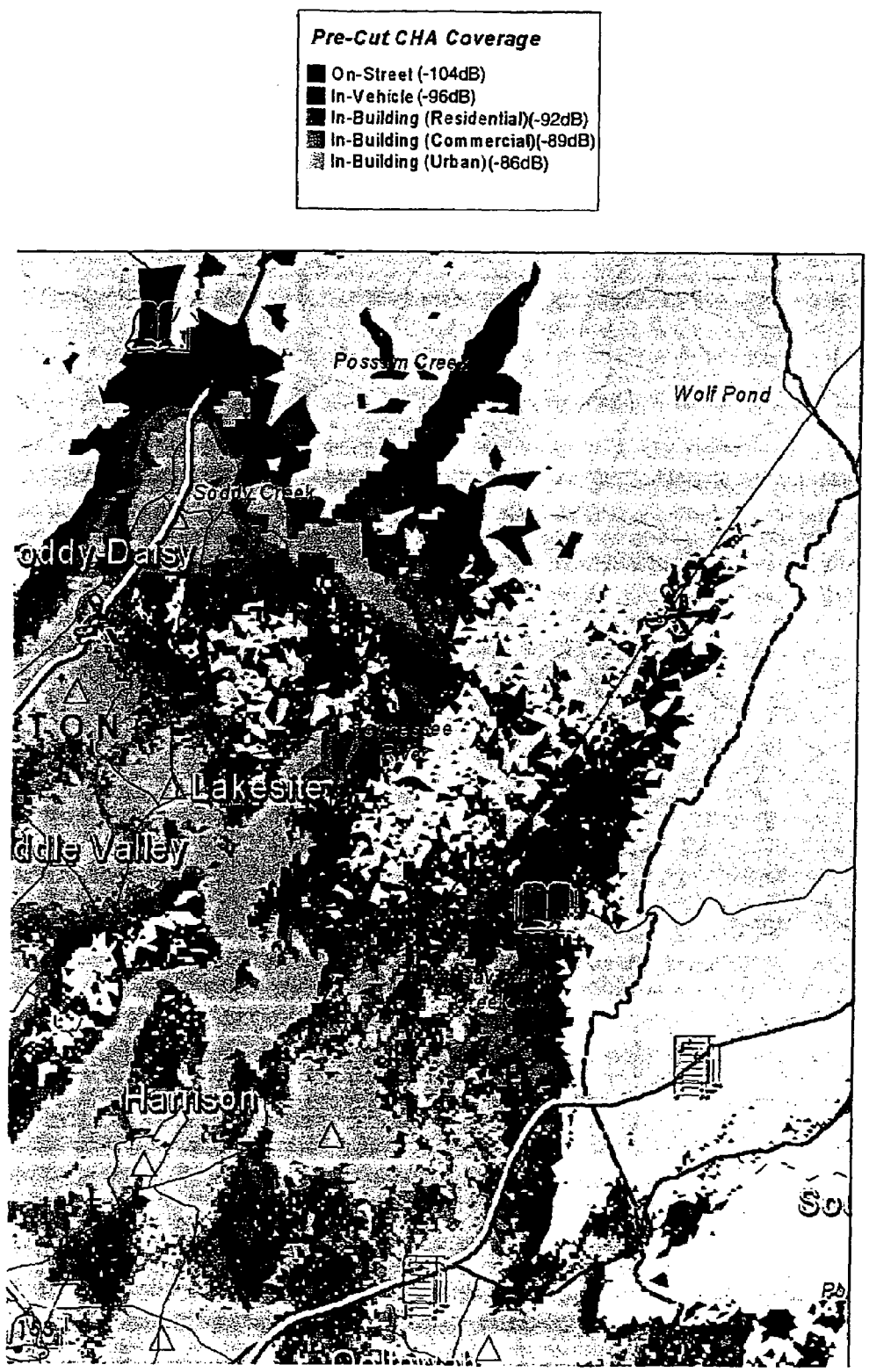
Figure 8C:
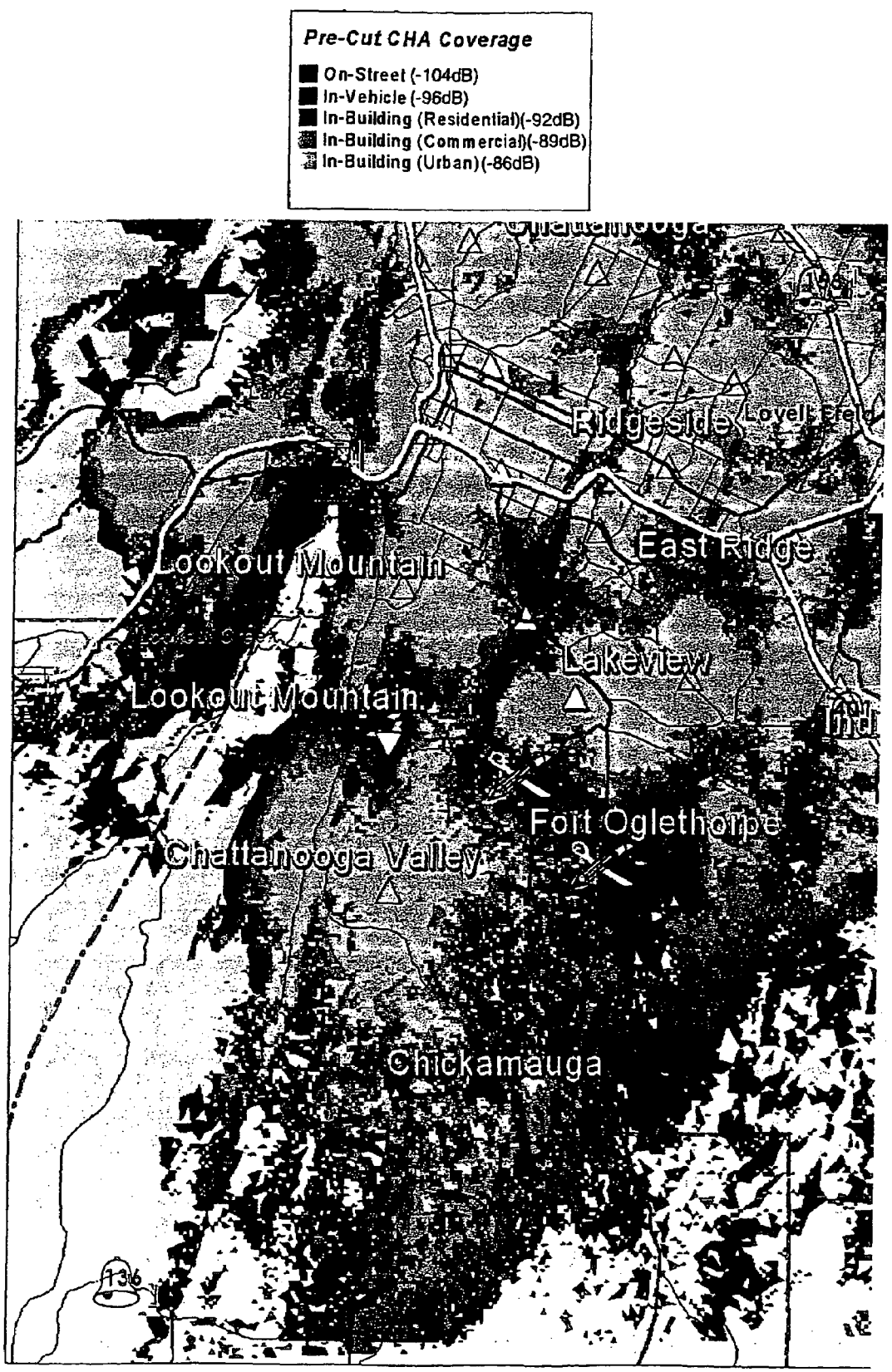
Figure 8D:
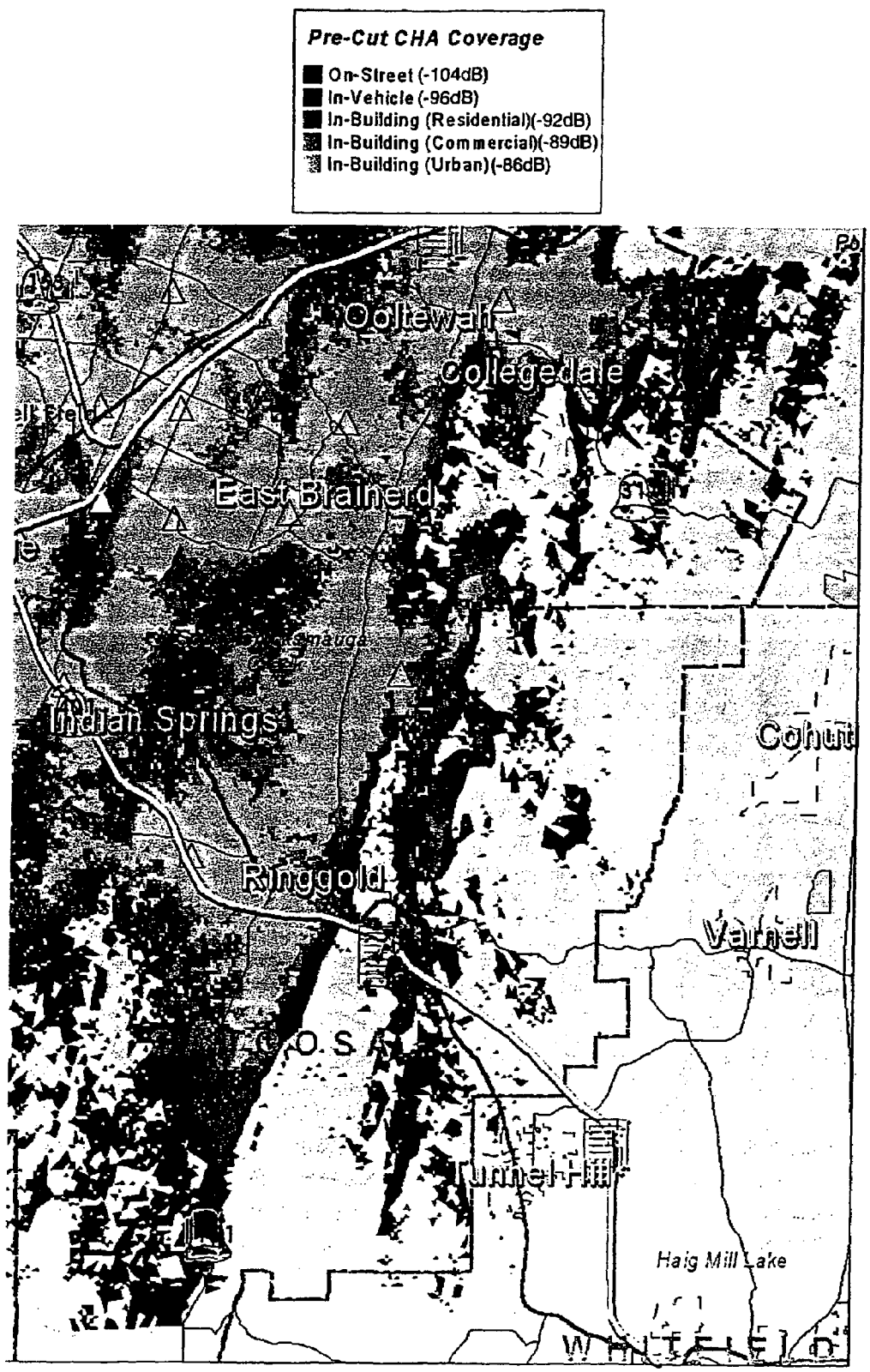
Figure 9A:
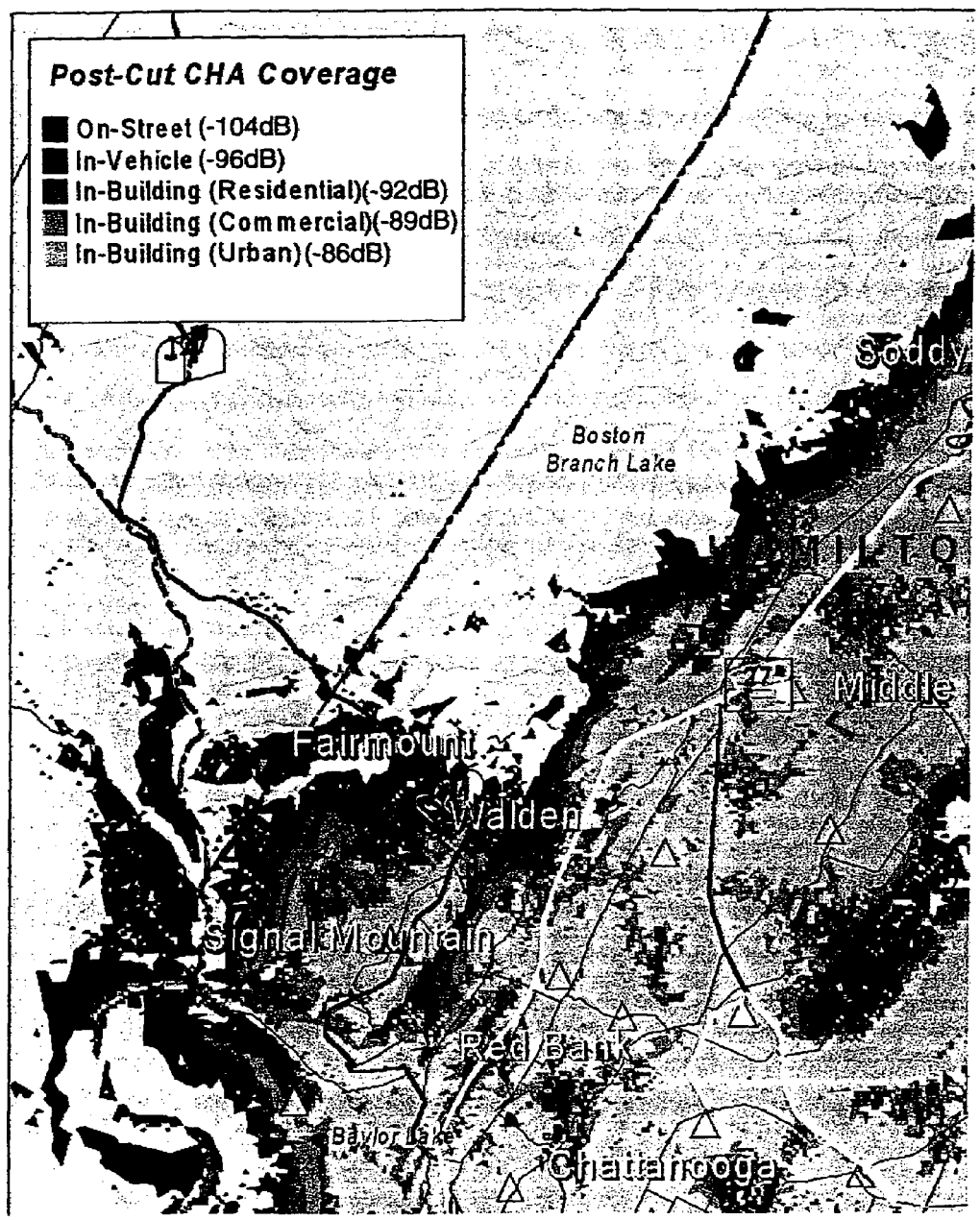
FIG. 9 is a map depicting system coverage of a cellular system according to the present invention.
Figure 9B:
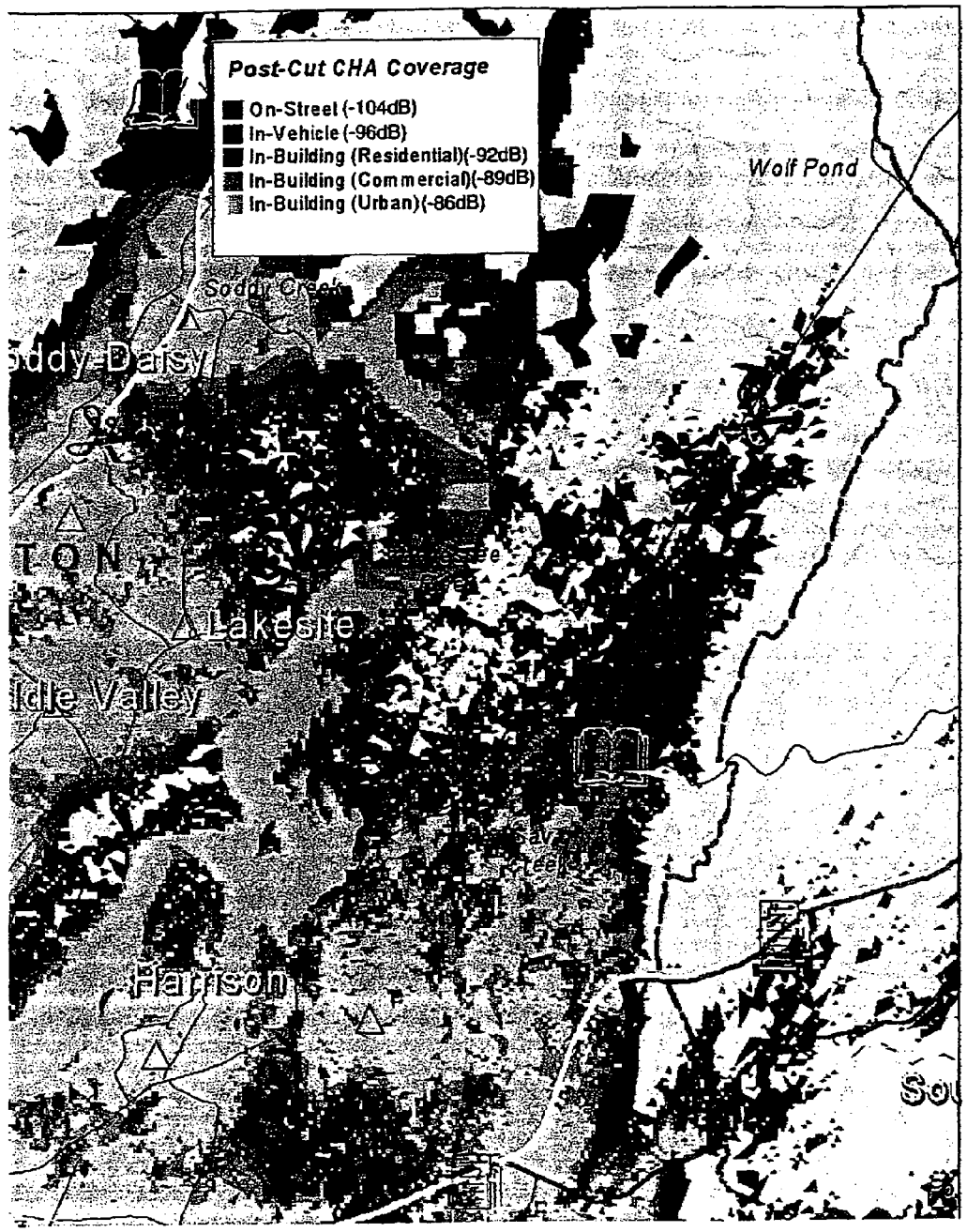
Figure 9C:
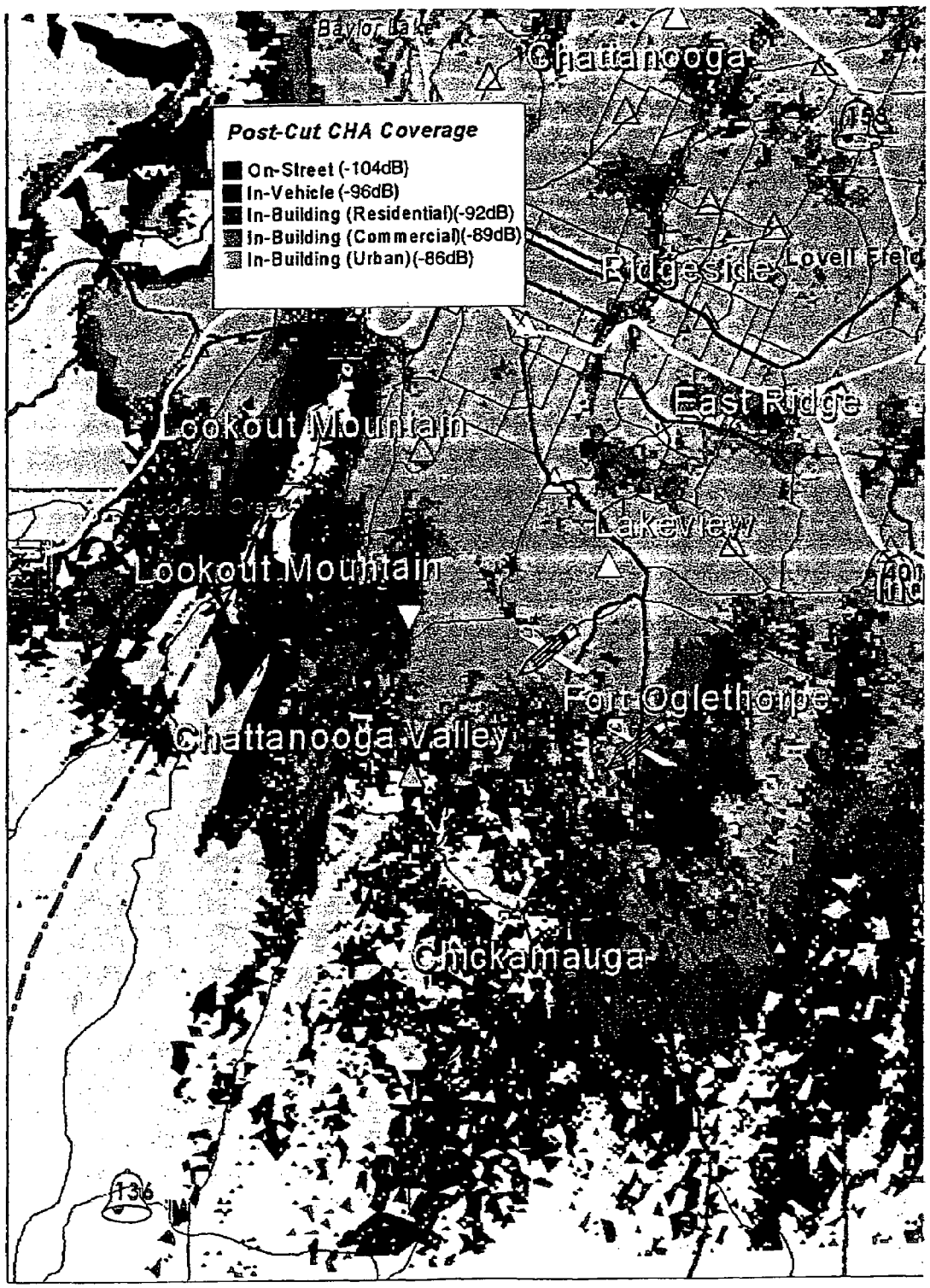
Figure 9D:
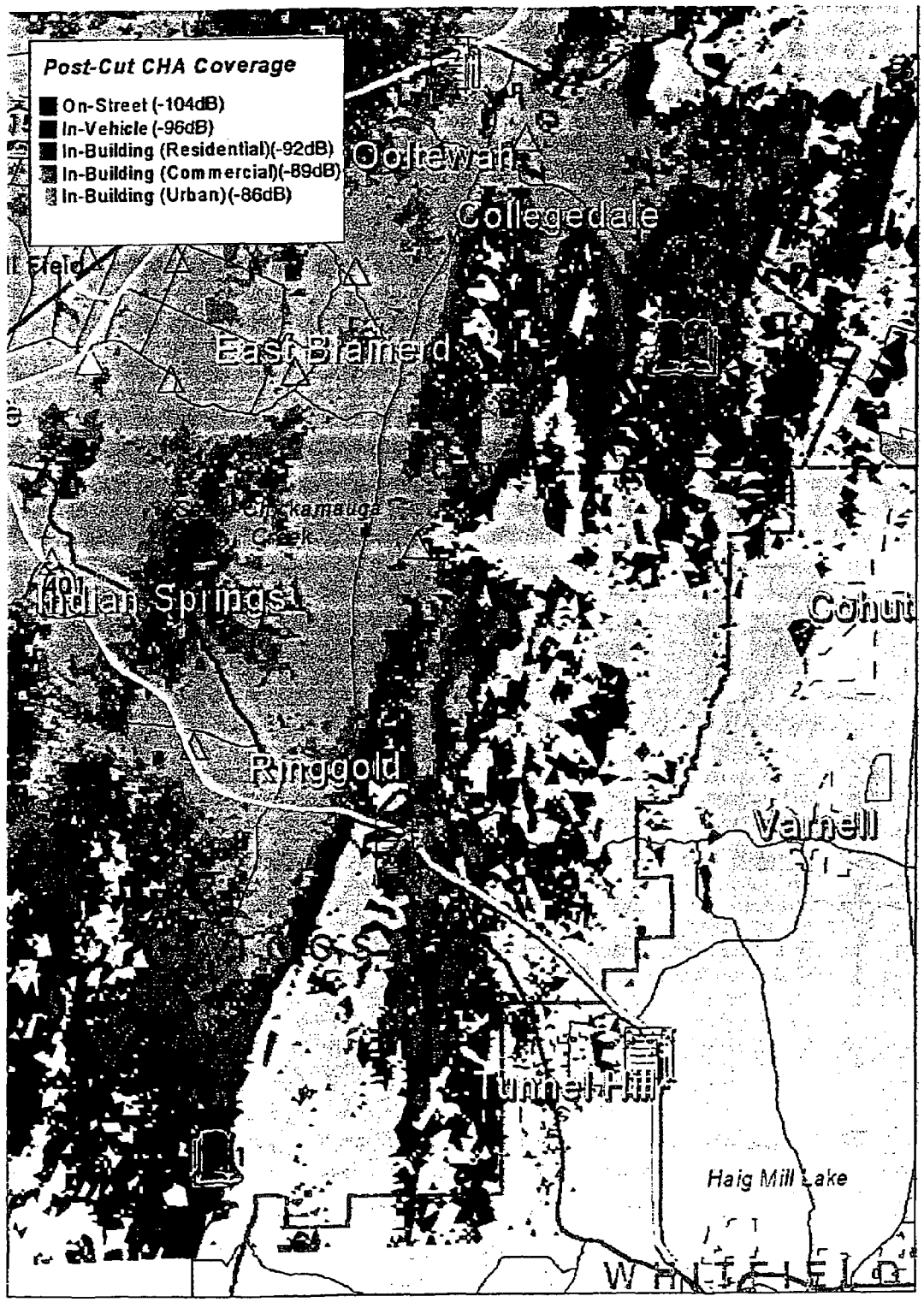
Figure 10A:
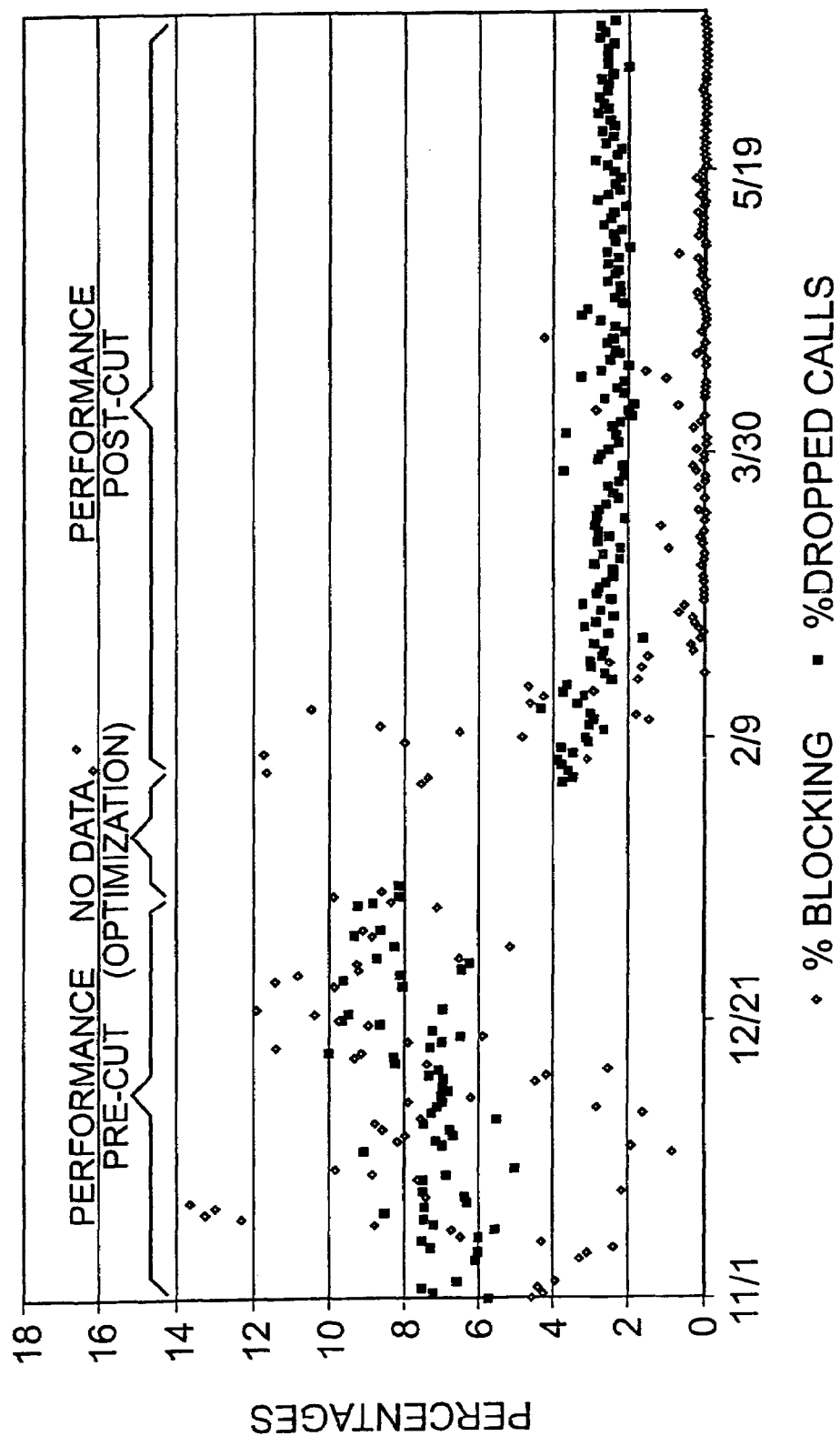
FIG. 10a is a graph depicting actual network performance of both a system known prior to the present invention and a system according to the present invention with respect to combined dropped and blocked calls.
Figure 10B:
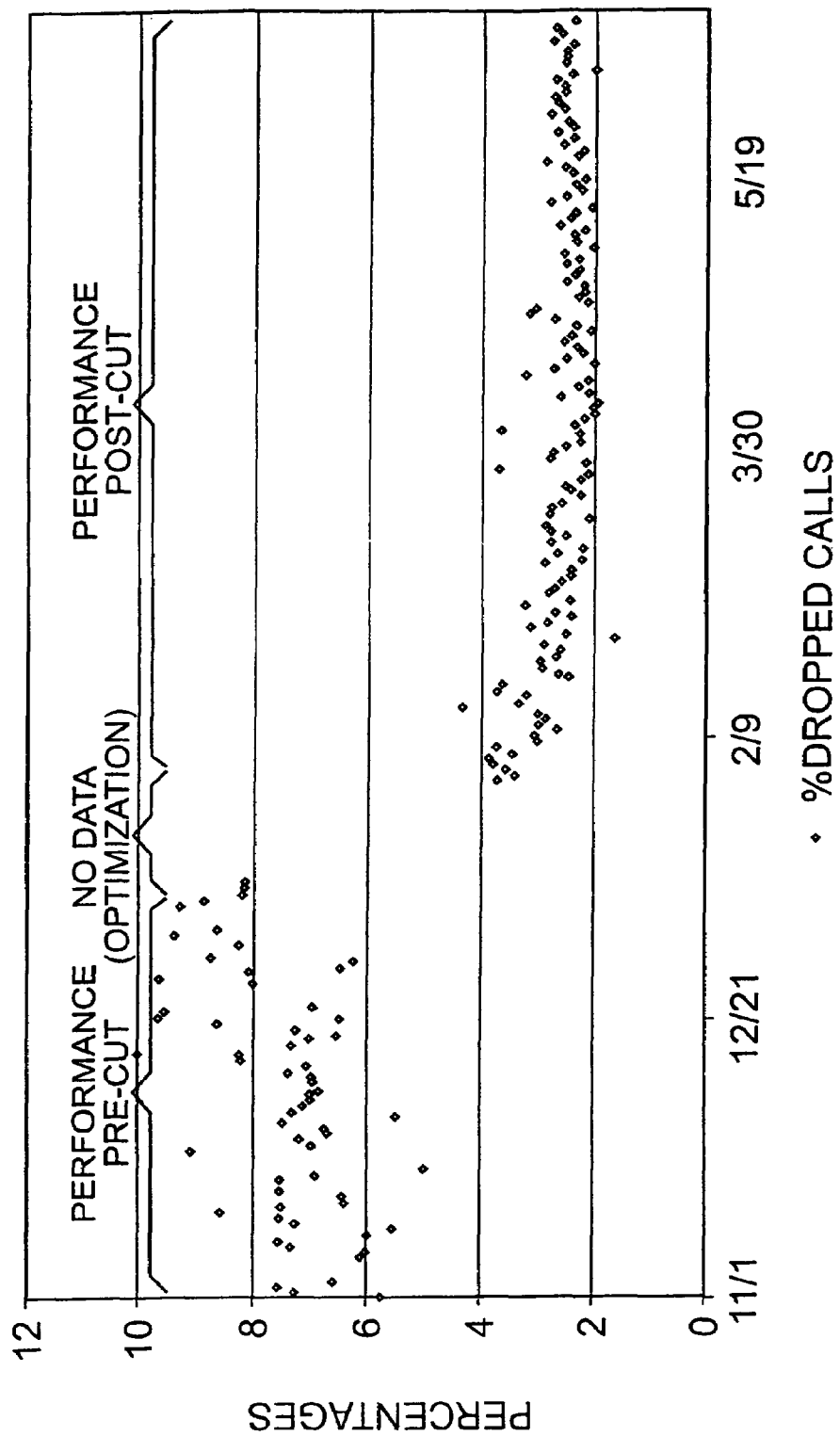
FIG. 10b is a graph depicting actual network performance of both a system known prior to the present invention and a system according to the present invention with respect to dropped call percentage.
Figure 10C:
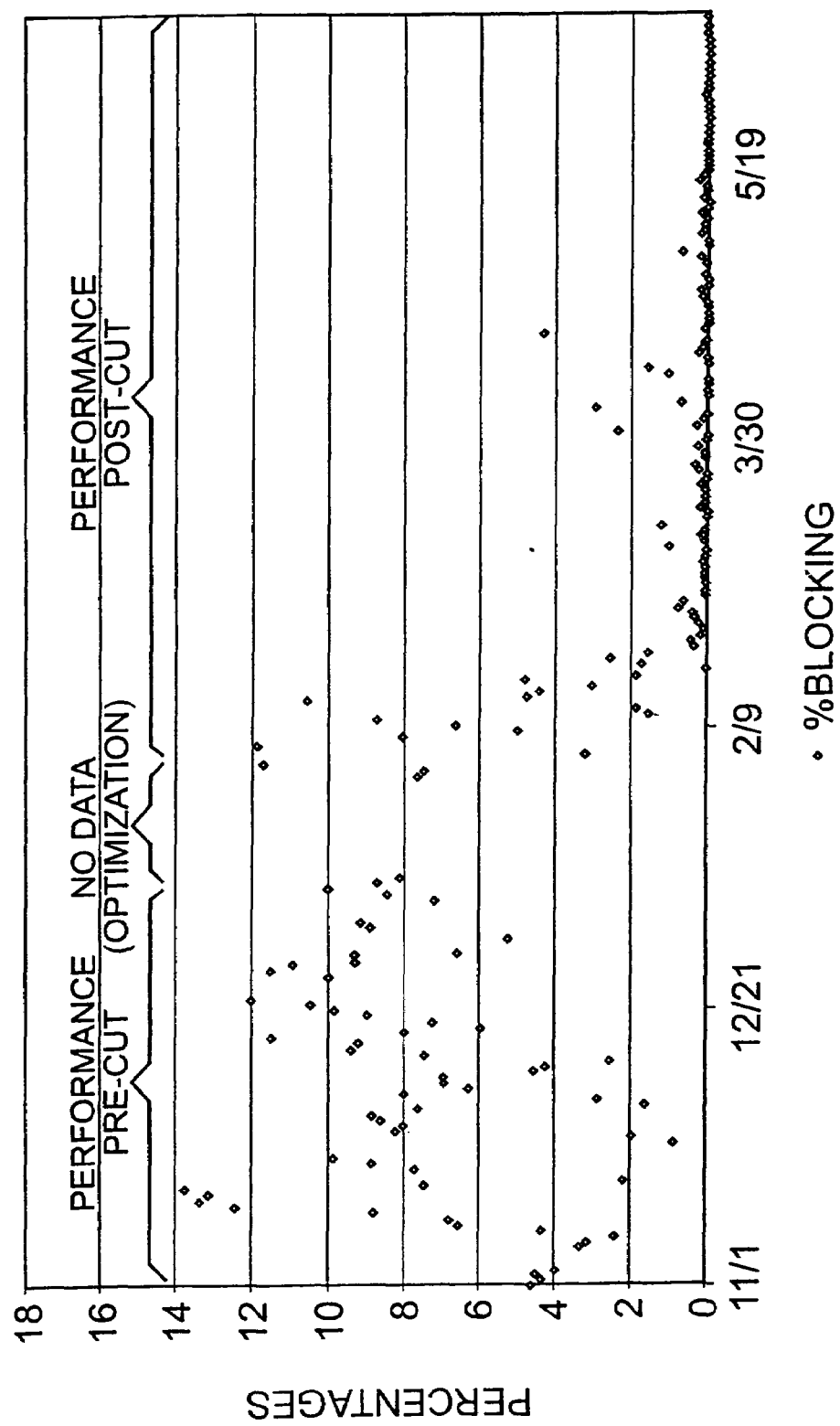
FIG. 10c is a graph depicting actual network performance of both a system known prior to the present invention and a system according to the present invention with respect to blocked call percentage.

FIG. 6 depicts a predicted change in System RF Blocking Rate upon conversion of a system according to the present invention. FIG. 7 estimates demand vs. capacity upon conversion to a system according to the present invention. Further, conventional cellular systems typically exhibit a high rate of dropped and blocked calls, as shown in FIGS. 10a-c. This is due to a coverage based design methodology, thereby leading to mis-placement and mis-sizing of cell sites, inadequate capacity, inadequate in-building capabilities, and consequent over-subscription of the switch and high blocking levels, in contrast to the present invention.

The restriction of calling to within an island allows for a managing of variable interconnect costs, thereby eliminating the net outflow of interconnect charges that might otherwise occur. For example, in a typical PSTN network, payment is owed to a second carrier from a first carrier for a call made outgoing from a user of the first carrier to interconnect into the second carrier. However, when a call is incoming to interconnect into the first carrier from the second carrier, payment is owed from the second carrier to the first carrier. Through the use of flat rate calling within the island, the number of incoming calls received is increased relative to the number of outgoing calls from the island, as discussed hereinbelow, and these interconnect costs are thereby managed.

Specifically, the present invention may, for example, allow the inter-connection cost balance to migrate from the approximately 65/35 ratio of outgoing to incoming calls known in the current wireless communication art, to a 55/45 ratio, or another ratio closer to a desired 50/50 ratio. The present invention has achieved an improvement of this ratio on an expedited basis, achieving a 53/47 inter-connection ratio within approximately a year and a half in an exemplary embodiment. For example, when a user is charged by the minute, the user may tend to leave the phone off when that user is not placing a call in order to avoid receiving charges for unwanted calls. This may result in a system operator generating far more outgoing calls than are received within the system. This means that there is a greater chance of the user making a call to a number outside the service area than of receiving one from outside the service area. Interconnect charges, therefore, would tend in the direction of the system operator having to pay to operators of other systems fees for outward bound calls made from users within the system.

Figure 4:
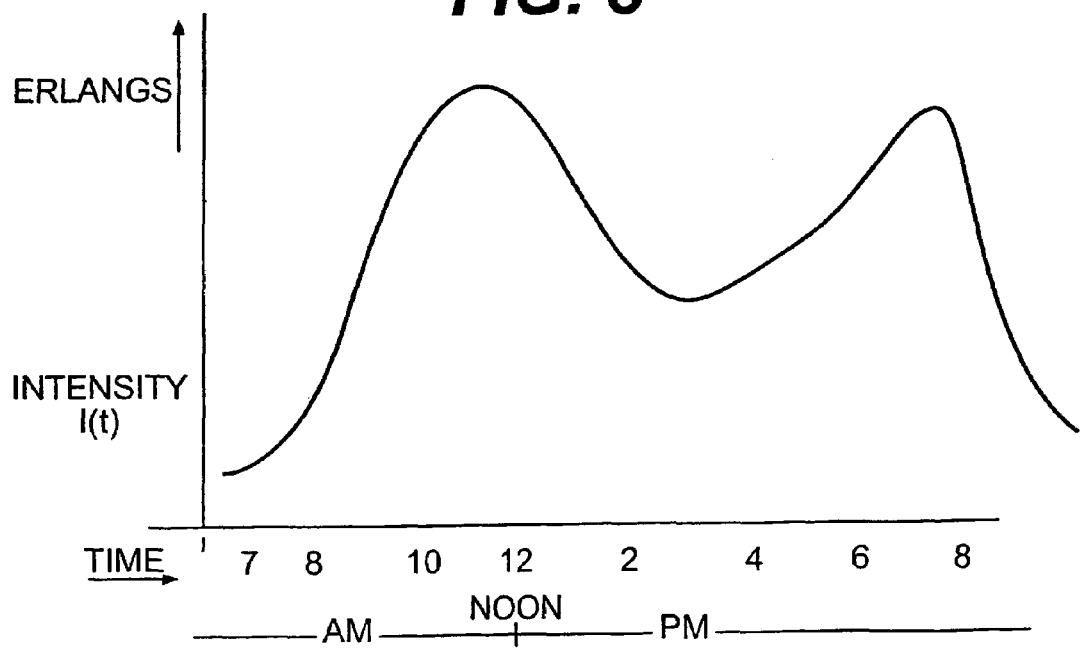
FIG. 4 is a graph illustrating a typical demand curve for a wireless system of the type known prior to the present invention.
Figure 5:
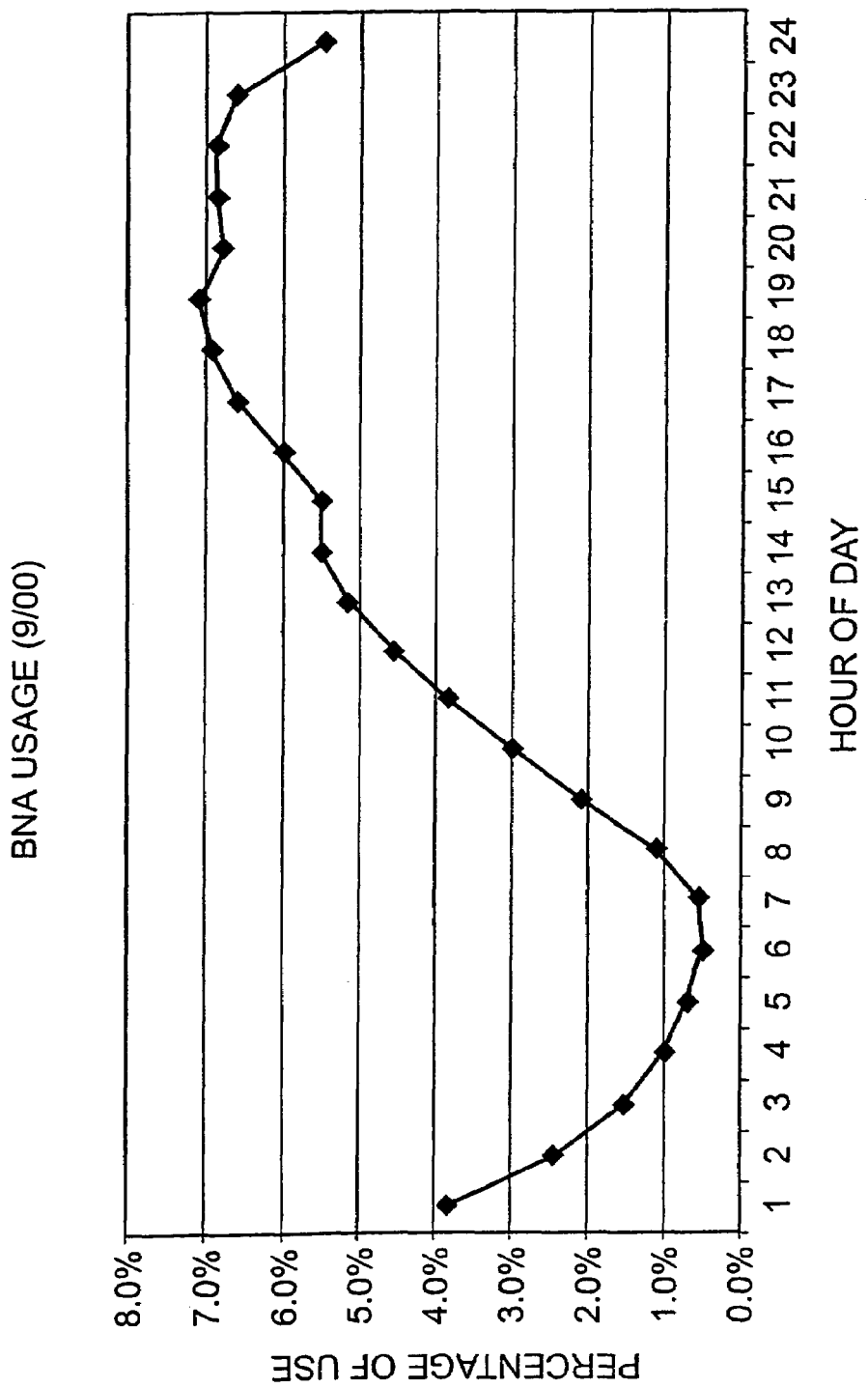
FIG. 5 is a graph illustrating the busy hour utilization of a wireless system of the type known prior to the present invention.

Additionally, improved in-building coverage, flat rate calling, and the trend toward a 50/50 ratio causes calling to be spread more evenly throughout a given time period in the present invention. A typical demand curve for a wireless communications system is depicted in FIG. 4. Such a wireless system generally has two peak times for use during the day. These occur at approximately 11 am and 7 pm, as illustrated in FIG. 4. In addition, the changes in demand from peak time to low-usage time are significantly high. In contrast, it is desirable to achieve a demand curve for a wireless system that is relatively flat and does not have the peaks and significant deltas in demand that occur in conventional wireless systems, as shown in FIG. 5. FIG. 5 illustrates a typical busy hour utilization according to an embodiment of a wireless system according to the present invention.

The elimination of the peak calling times known in the prior art allows for a decrease in the costs to design a network, because the network does not need to handle capacity of peaks of the size known in the prior art. In general, at no time during any 24-hour period may the system of the present invention be unused. Each user segment may for example, use at least ¼ minute of service during any given hour, although this is of course not required. Thus, rather than building peak system capacity throughout the coverage area, according to an aspect of the present invention capacity can be tailored within each cell to expected local traffic patterns. This allows a reduction in system cost. Fewer cells may be built and the capacity of the cells that are built may be increased. This enables a system according to the preset invention to achieve effective coverage for the service area with only about 80% of the number of cell sites of a conventional wireless system, when sites that are related primarily to highway and roaming coverage are removed or omitted, for example. Further, the reduction of high peak usage, thereby leading to a flattening of the usage curve, allows the operator to operate without dependence on variable usage patterns, which variable use patterns result in fluctuating revenues. In other words, as revenues are based upon service and not the specific features employed from call to call, the revenue stream may be leveled, offering revenue predictability and certainty.

TABLE 6

| | San Diego Marketplace | | | |
|---|---|---|---|---|
| | Air Touch | Sprint | PBMS | The Present Invention |
| Anticipated Number of Cells | 181 | c.190 | c.280 | 155 |

As illustrated in Table 6, and as a result of the present invention, overall capital expenditures, both on a per subscriber and on a per Erlang basis, can be reduced dramatically, due to the generation of a network of islands of service thereby allowing for a reduction in the number of cell sites necessary to provide the desired service. According to an embodiment of the present invention, the capital expenditure per subscriber may be reduced in the range of 12 to 25% of the capital expenditure per subscriber in year 1 relative to conventional wireless systems, to a range reduction of 25 to 50% of the cumulative capital expenditure per subscriber in year 10. Moreover, due to the higher capacity utilization of the present invention, the cost saving to the operator between the present invention and conventional systems in cumulative capital expenditure per unit of usage is more substantial. It is believed that cumulative capital expenditure per unit of usage (Erlang) in year 1 may be about 5% to 15% less as compared to conventional wireless communications systems; in year 10, it may be as low as one-half. Based upon these factors, the break even point for a network according to the present invention may occur substantially sooner than for conventional wireless communications networks.

From a cost standpoint, it is preferable that penetration of six to eight percent of the covered population be achieved by the close of year one following deployment of the network of the present invention, and that ten percent penetration be achieved by end of year three. This preference is based on a preferred target average of covered population per cell site of between 10,000 and 15,000 users and a co-location percentage with sites of other carriers for deployed sites of 50 to 70 percent, for example. It is most preferred that the covered population in the present invention be in the range of 4,000 to 10,000. By the close of year three of operation of the network of the present invention, it is preferred that network utilization, i.e. the ratio of the percentage of the capacity of the network in use at non-peak use periods to the maximum designed capacity of the network, be about 70 percent. It is preferred that, by end of year one of operation of the present invention, off-peak utilization be in the range of 45-60 percent. Network utilization is calculated herein as the total network Erlangs offered divided by the network theoretical Erlang capacity.

The calculations illustrated in FIGS. 1-5 and 8-9 show various points for comparison with the capacity based design of the present invention shown in FIGS. 6-7, and FIGS. 1-5 and 8-9 are based upon the "Typical PCS Company" model, as disclosed by Donaldson, Lufkin & Jenrette in THE GLOBAL WIRELESS COMMUNICATIONS INDUSTRY (1999).

Table 7 compares mobile systems of the type known prior to the present invention, standard wireline systems, and the system of the present invention on a number of criteria.

TABLE 7

Comparative Performance

|  | Mobile | Wireline | Present Invention |
|---|---|---|---|
| Busy-hour Erlangs | | | |
| Business | 20 me | 80 me | 0 me |
| Residential | 10 me | 50 me | 50 me |
| Minutes of Use (Average/Month) | | | |
| Business | 200-300 | ~2000 | 0 |
| Residential | <150 | ~900 | 950 |
| Peak-hour System Traffic | 17-20% | 10-12% | 10-12% |

FIG. 19 provides information regarding the anticipated capital expenditure per subscriber of the present invention, in approximately 2000 dollars. As shown in FIG. 19, capital expenditure may be higher in the early years, during which the island networks are generated, and may decrease as each system matures. The initial peak for systems such as the Power Tel (GSNI), and Sprint (CDMA) systems, depicted in FIG. 19, have historically been higher in the earlier years than that of the present invention. Similarly, capital expenditure per Erlang is generally higher during early system life, and decreases over the life of the system. It will be noted that the capital expenditures of the Power Tel and Sprint systems are substantially higher during the early system life than is the present invention. Similarly, the present invention may, based on the results illustrated in FIG. 19, provide savings of up to two thirds in later years, relative to the capital expenditure per Erlang of the Power Tel and Sprint systems.

Costs may be further reduced, and user convenience increased, in an embodiment of the present invention, by offering the user at least one phone, pre-programmed and/or pre-activated with a unique telephone number, and subject to a flat rate calling plan for use only within the island. In an embodiment of the present invention, a discount may be given off of the price of each handset for the purchase of multiple handsets. Also in an embodiment of the invention, a surcharge may be made on the monthly bill for possession of multiple telephones. The present invention may serve to reduce activation-related costs by selling the phones pre-activated. This reduces the effort required to activate. Rather than supplying skilled customer service personnel to assist in activation, activation may be conducted by the customer upon leaving the store. The flat rate calling plan may additionally include per minute charges for long distance calls made from within the island, or may include prepaid long distance. Sales may be oriented to mass merchandising and mass retail outlets, rather than, or in addition to, dedicated specialty stores that require higher investment in real estate and operating expense. Advertising may be directed at mass channels and mass markets. Similarly, marketing efforts are directed in areas where traffic generation is high, such as mass merchandising retailers. Further, by packaging the phone in, for example, a box, with at least a portion of the marketing and/or use instruction information contained on or in the packaging, many user questions may be answered by a review of the product offering, thereby lowering technical support costs. The limitations on available options and services further serves to limit direct selling, billing inquiry, and technical support expenses. The result of the diversity of handsets, rate plans, and service offerings has historically been consumer confusion and an increase in direct selling expense. For example, conventional cellular services are typically highly diversified and segmented, featuring highly complex pricing plans and usage models. The selling activity typically requires highly trained customer service representatives to explain the various phones available, the features, and the relative benefits and disadvantages of the various service plans relative to a particular customers usage pattern. This adds substantial selling cost to a wireless operator. In contrast, according to an aspect of the present invention, a simple plan featuring high volume usage may be advantageously used.

Additionally, with respect to system costs, the billing system of the present invention, in an exemplary embodiment, may include simplified "one-line billing", i.e. billing based upon a flat rate for cellular service. The flat rate may be, for example, sufficiently low to enable the attraction of additional users that might otherwise, such as for financial reasons, be unable to engage in use of a wireless communications device subject to traditional metered billing formats based upon minute of use charges. Unlimited use may be made available based upon payment of the flat rate, or service may be bundled, such as in 400, 600, or 1000 minutes, for example, based upon payment of the flat rate. Further, payment of, for example, the flat rate, may be requested in advance, thereby eliminating or substantially reducing accounts receivable and the correspondent costs for employees to track accounts receivable. Service may, for example, be terminated for non-payment, thereby eliminating or reducing costs to engage in collections. Additionally, over-the-air activation may be implemented in the present invention in order to substantially reduce activation costs to the operator. In accordance with the present invention, operating expenses preferably do not exceed 85% of the monthly fee. Thus, in an embodiment wherein the gross revenue per user, i.e. the flat rate charge, is $40, it is preferably that the operating expense for that user be less than $34, and most preferably be less than, for example, $26.

The present invention may include an interactive web site, at which users may buy and/or activate phones, purchase accessories, check account balances, pay bills, and/or communicate with customer service representatives. Thus, in the present invention, automatic recurring bill payment is encouraged. Customers may pay by personal credit card on a recurring basis, such as where the monthly billed amount is automatically charged to the credit card at the close of each billing period. The billing period of the present invention may be, for example, daily, weekly, monthly, or annually. If credit card payment is not selected by the customer, the customer may be encouraged to have the bill automatically charged to, for example, a checking account, via an electronic fund transfer. Alternatively, payment may be made by cash or check each month.

In an embodiment of the present invention, it is preferred that acquisition costs per subscriber be less than $500, and most preferably less than $230. Further, it is preferred that a 7% market penetration be achieved, and that a churn rate of less than 4% after three months or more be achieved.

FIG. 18 illustrates an exemplary change-over to a network operating system of the present invention. It is noted that the system achieved a 7.7 percent market penetration in 12 months of operation. The costs were less than $230.00 per customer. The support costs per average subscriber were approximately $5.60 and the operations costs per minutes of use was 1.3 cents.

Table 8 compares the services, typical minutes of use per month, and average revenue per user of various types of telephony systems, namely, Cellular, PCS, the present invention, and traditional fixed wireline service. As shown, the present invention approximates the level of service available from traditional wireline service at a cost that approximates traditional wireline service, while offering many of the same features of other wireless communications networks.

TABLE 8

Product Comparison

| Product | Service | Pricing | |
|---|---|---|---|
| | | MOUs | ARPU |
| Cellular | Wide footprint with feature-rich service in digital footprint coverage area and analog services in the rest of the covered area. Nationwide roaming available. Voice quality varies and coverage is highway-focused. | 100<br>200<br>500<br>1000 | $20-22<br>45<br>100<br>200 |
| PCS | Reasonable digital footprint with rich feature set. Large roaming footprint available with good voice quality. | 100<br>200<br>500<br>1000 | $20-22<br>40<br>90<br>160 |
| PCP | Regional digital coverage (local and toll) of areas where the user lives, works, shops, and plays with attaching major artery coverage. Limited feature offering of those services most wanted. No roaming. | 100<br>200<br>500<br>1000 | $28<br>28<br>28<br>28 |
| ILEC/CLEC | Fixed traditional wireline service with local service and rich feature set. Toll services and extra - although nominal charge and low penetration of services (call waiting, call forwarding, conference and voice mail). | 100<br>200<br>500<br>1000 | $22<br>22<br>22<br>22 |

Figure 21:
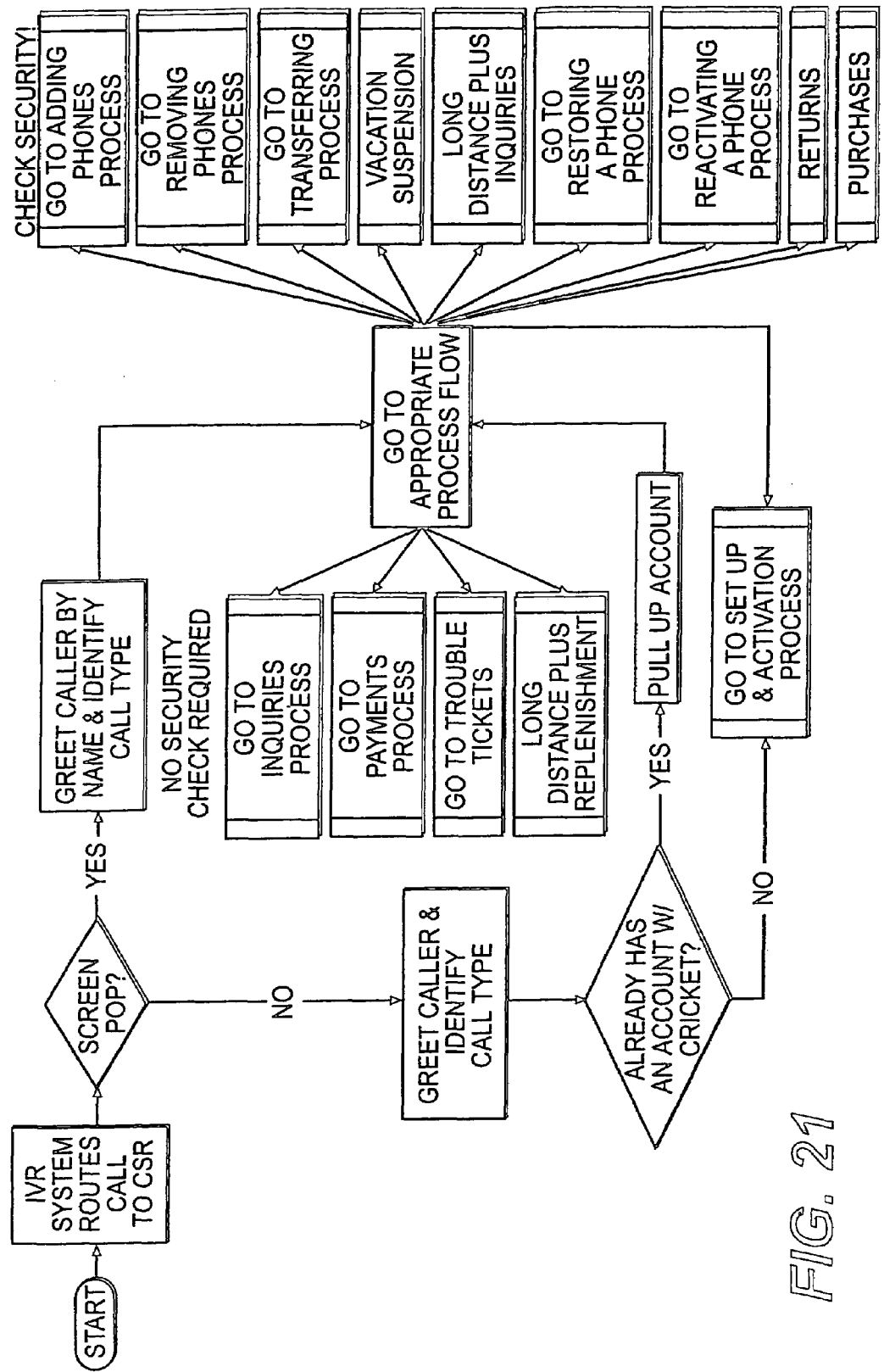
FIG. 21 is a flowchart depicting the process flow through the back office of a preferred embodiment of the present invention.
Figure 22:
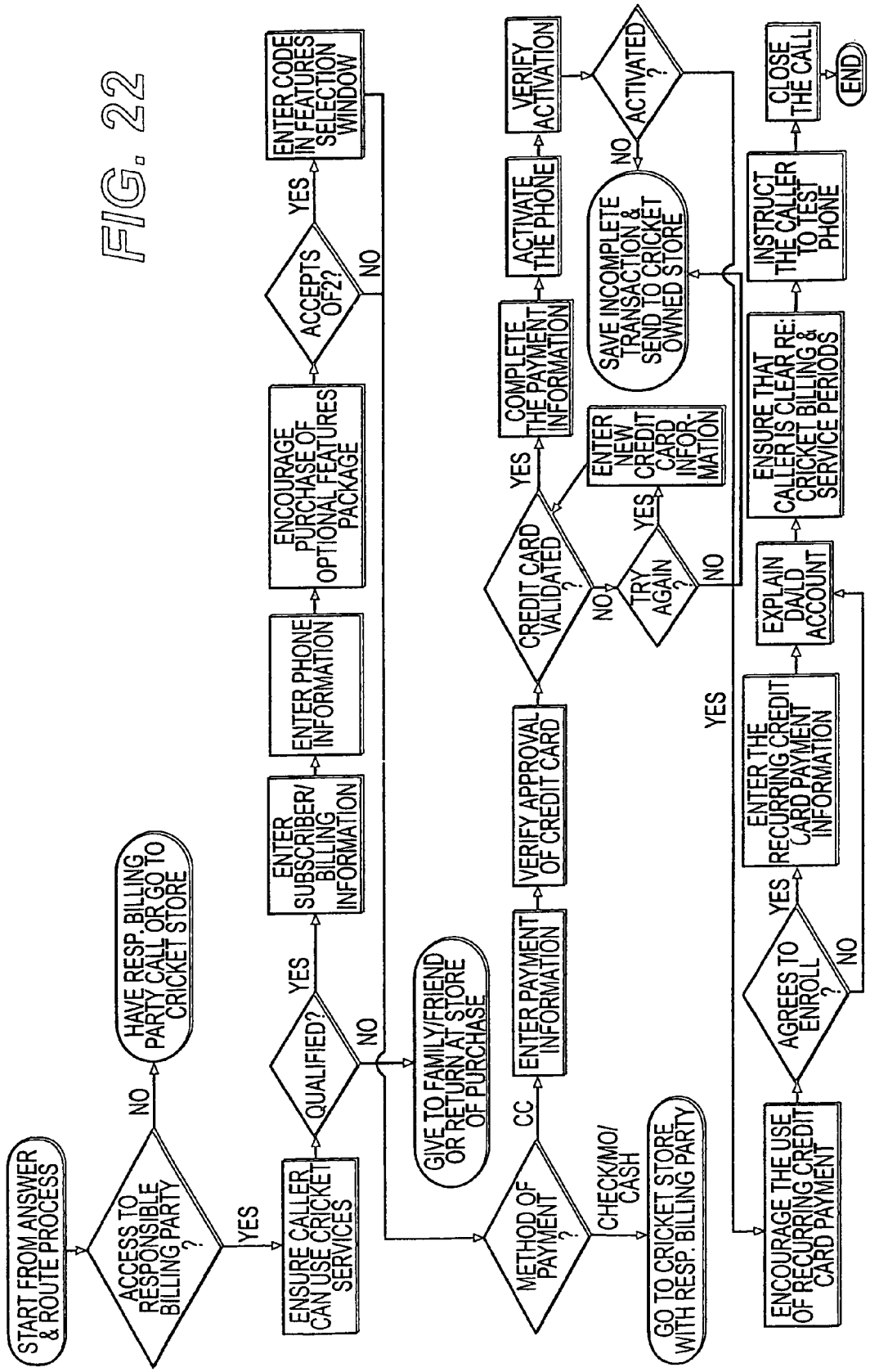
FIG. 22 is a flowchart depicting the process of set up and activation of a preferred is embodiment of the present invention.
Figure 23:
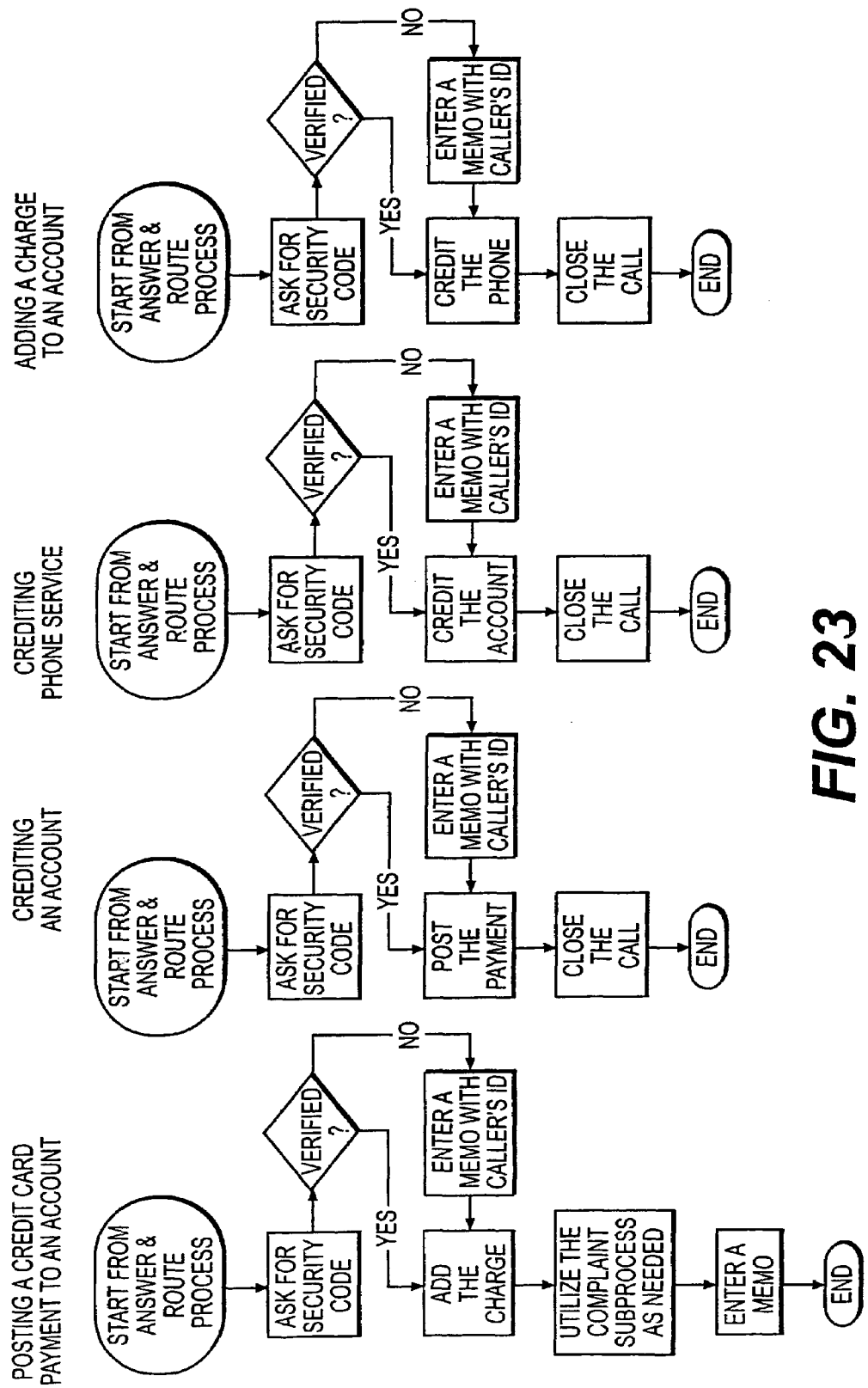
FIG. 23 depicts a process for adjusting the financial aspects of an account, for a preferred embodiment of the present invention.
Figure 24:
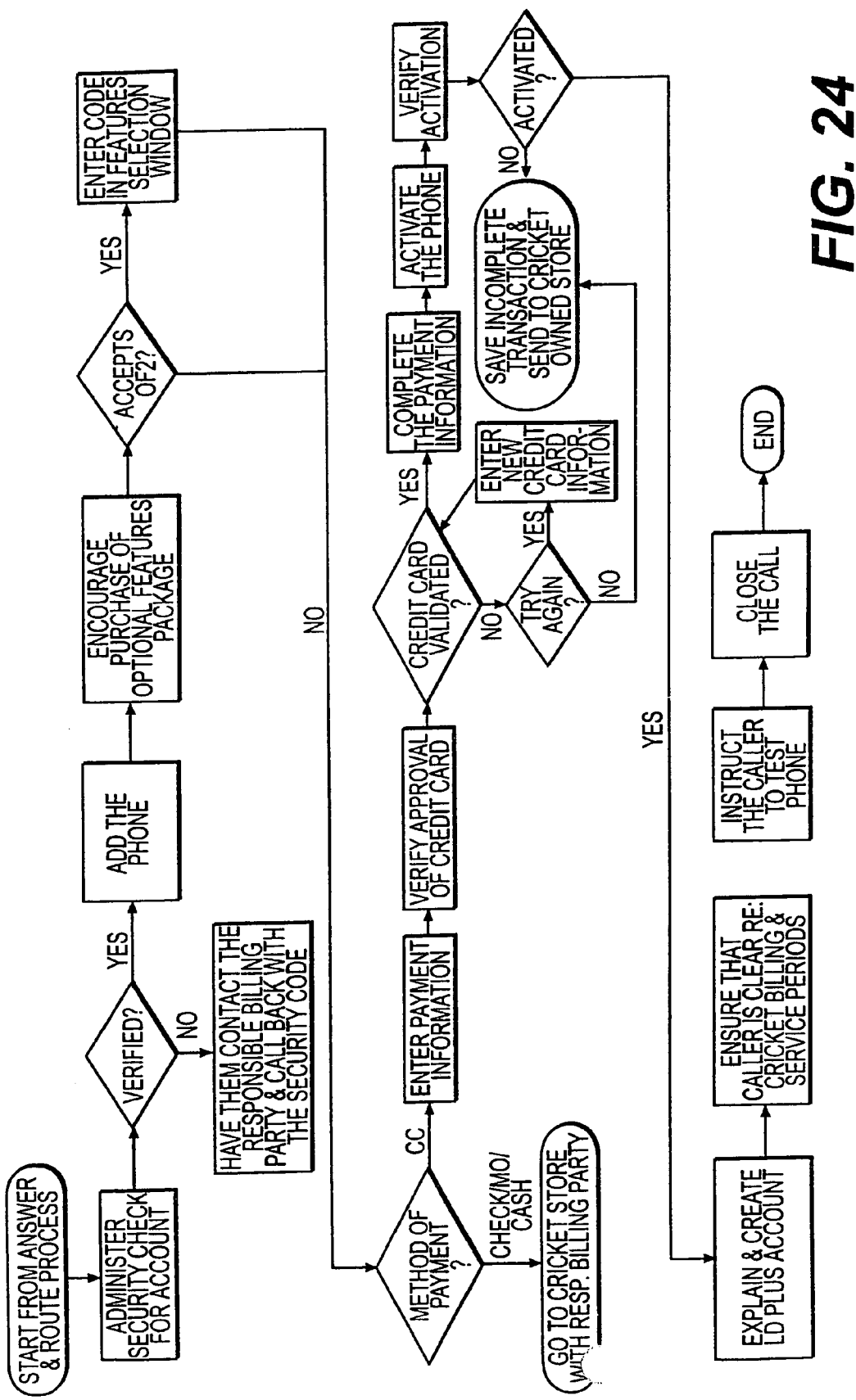
FIG. 24 is a flowchart depicting how to add a phone to an account in a preferred embodiment of the present invention.
Figure 26:
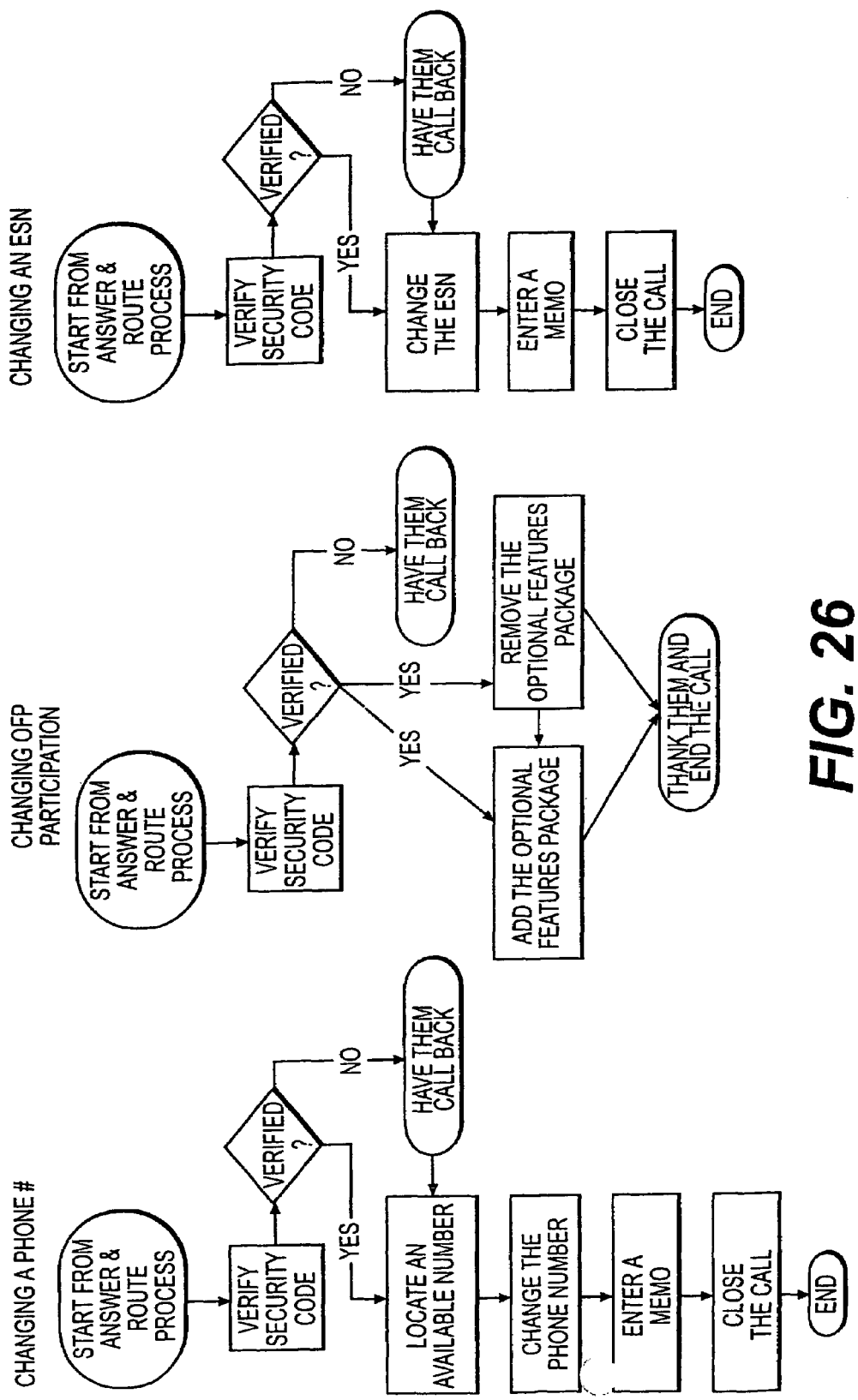
FIG. 26 is a flowchart depicting a process for changing a phone number and adjusting acceptance of optional features in a preferred embodiment of the present invention.
Figure 28:
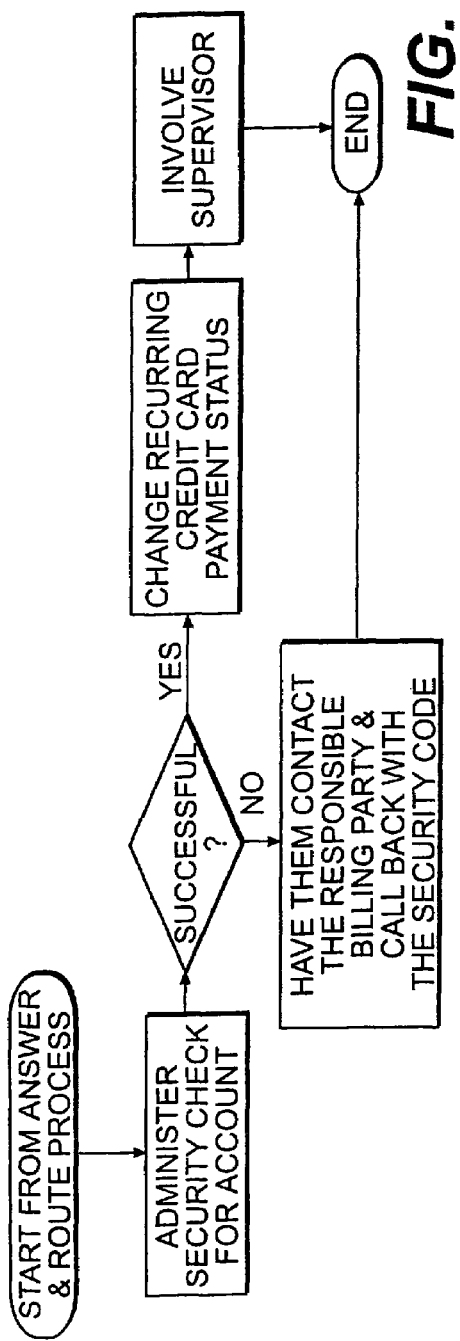
FIG. 28 is a flowchart depicting a process for changing recurring credit, card payment information in a preferred embodiment of the present invention.
Figure 29:
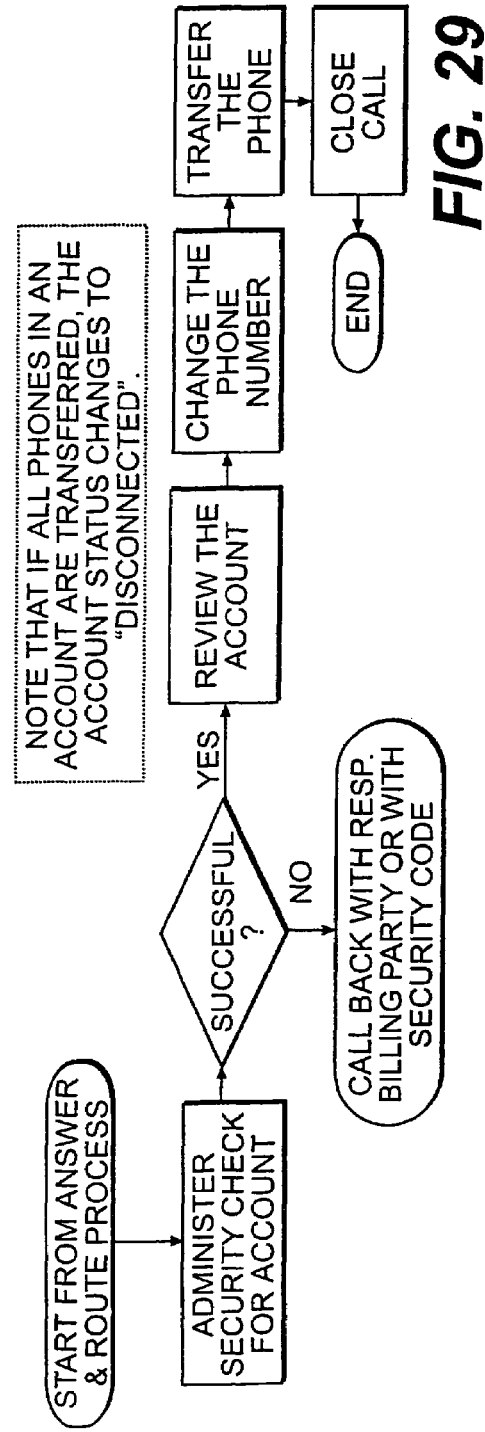
FIG. 29 is a flowchart depicting a process for transferring a phone in a preferred embodiment of the present invention.

FIGS. 21 through 34 depict various processes of an exemplary back office operation of an embodiment of the present invention. FIG. 21 is a flowchart depicting the manner in which the cost center of the back office of an embodiment of the present invention routes and handles call traffic. FIG. 22 is a flowchart depicting a process for set up and activation. The goal of this process is to provide service in one-call resolution when possible. FIG. 23 depicts a process for adjusting the financial aspects of an account, including posting credit card payment, accrediting an account, crediting phone service, or adding a charge to an account. FIG. 24 is a flowchart depicting the addition of a phone to an account. FIG. 25 is a flowchart of the manner of changing general information on an existing account, including a verification for accuracy. FIG. 26 depicts a process for changing a phone number and adjusting acceptance of optional features. FIG. 27 depicts a process for changing credit card information. Similarly, FIG. 28 depicts a process for changing recurring credit card payment information. FIG. 29 is a flowchart depicting a process for transferring a phone. In an embodiment of the present invention, and in order to further minimize costs to the operator in the present invention, service is terminated, and an account may be flagged, within a short period of time after the beginning of the month, such as, for example, after 5 days, if the user has not in fact prepaid the service fee for the next month.

Figure 30:
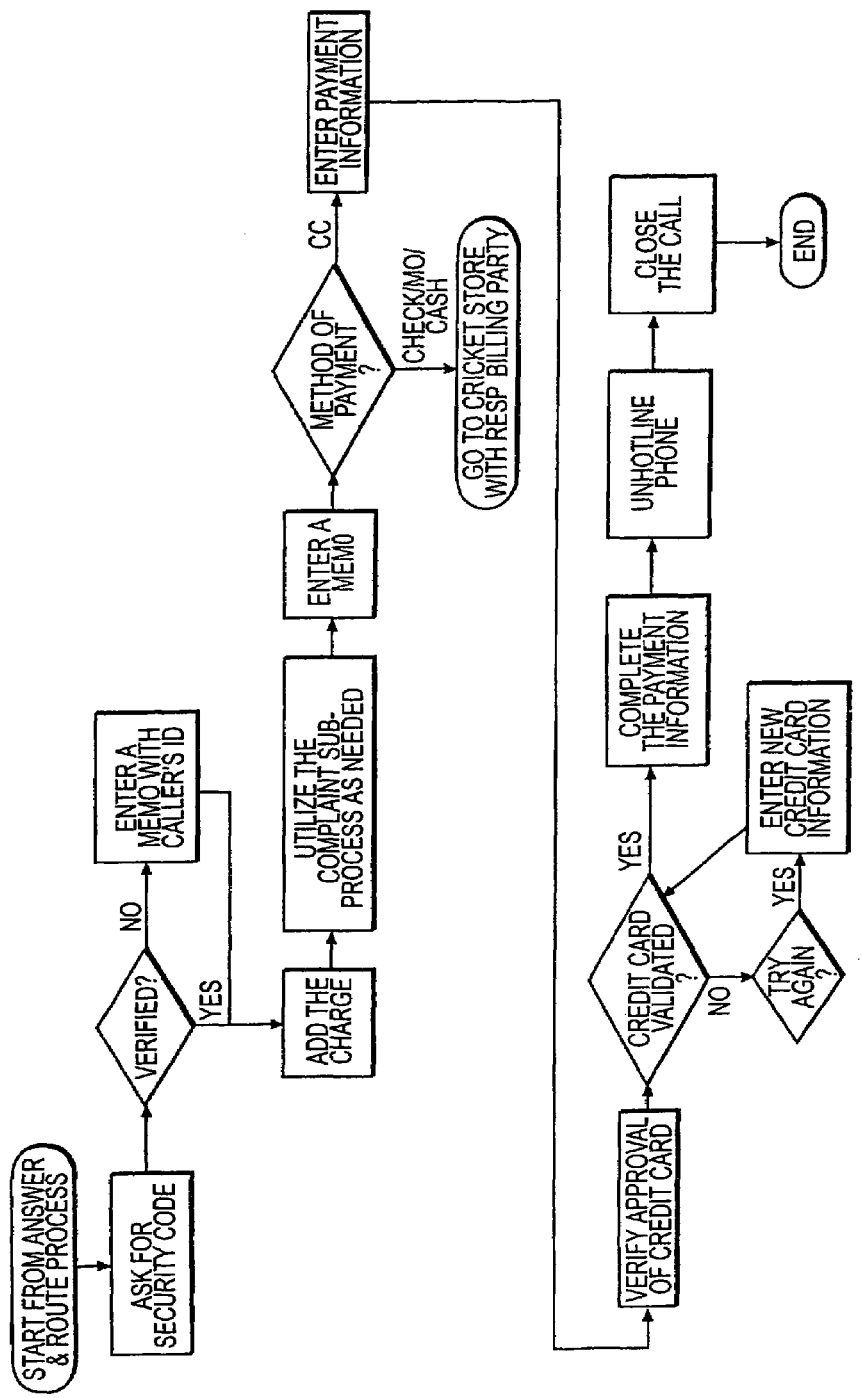
FIG. 30 is a flowchart depicting a process of "hotlining" and the process of restoring hotlining service in a preferred embodiment of the present invention.
Figures 31, 32:
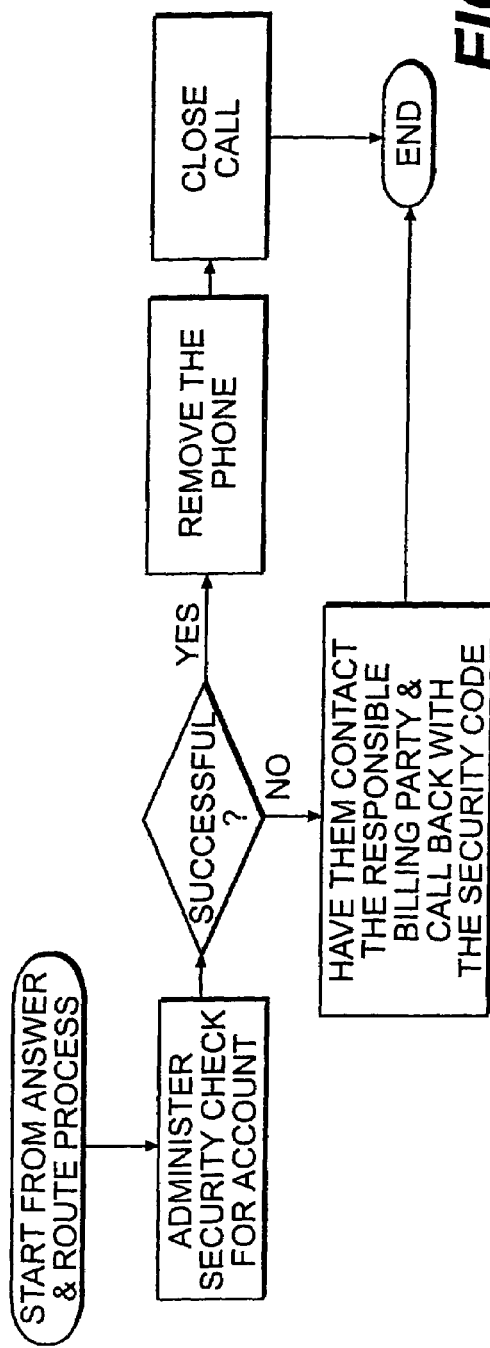
FIG. 31 is a flowchart depicting a process for removing a phone from a multi-phone account in a preferred embodiment of the present invention.
FIG. 32 is a flowchart, depicting a process for disconnecting a phone in a preferred embodiment of the present invention.
Figure 33:
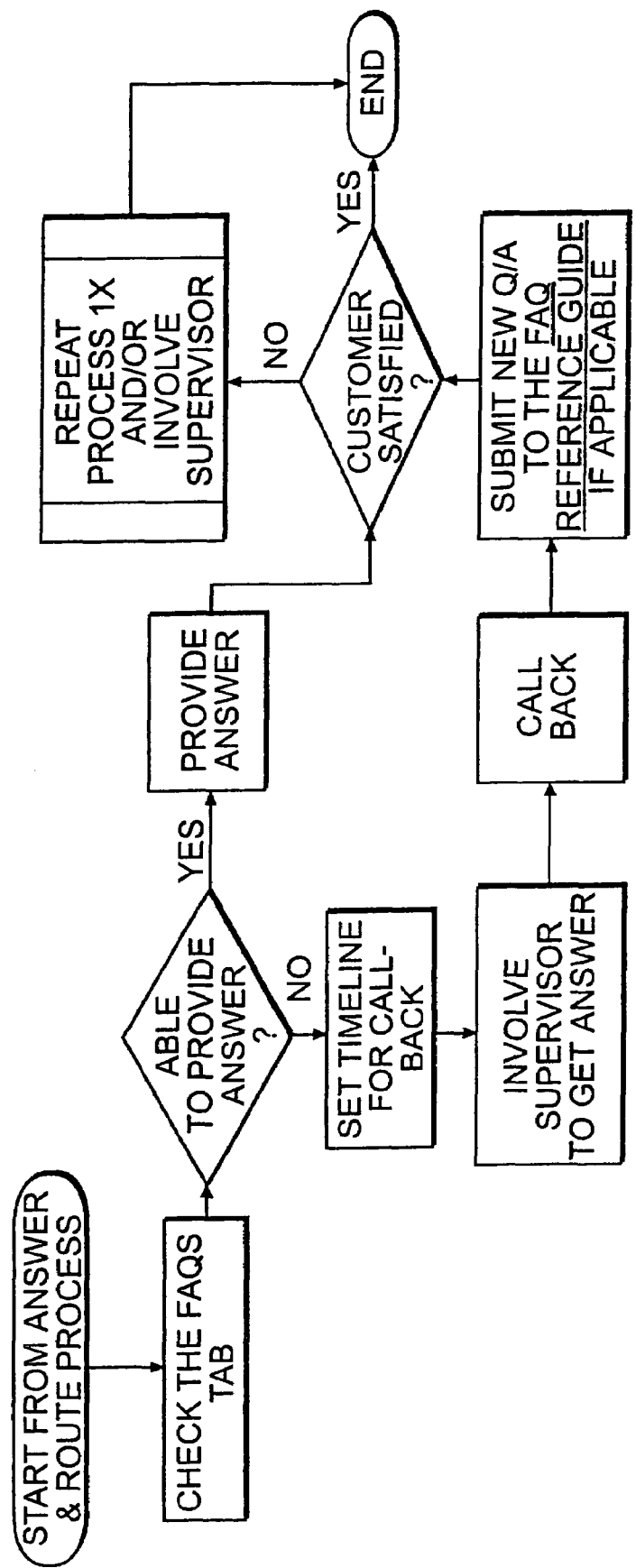
FIG. 33 is a flowchart depicting a process for dealing with frequently asked questions in a call center of a preferred embodiment of the present invention.
Figure 34:
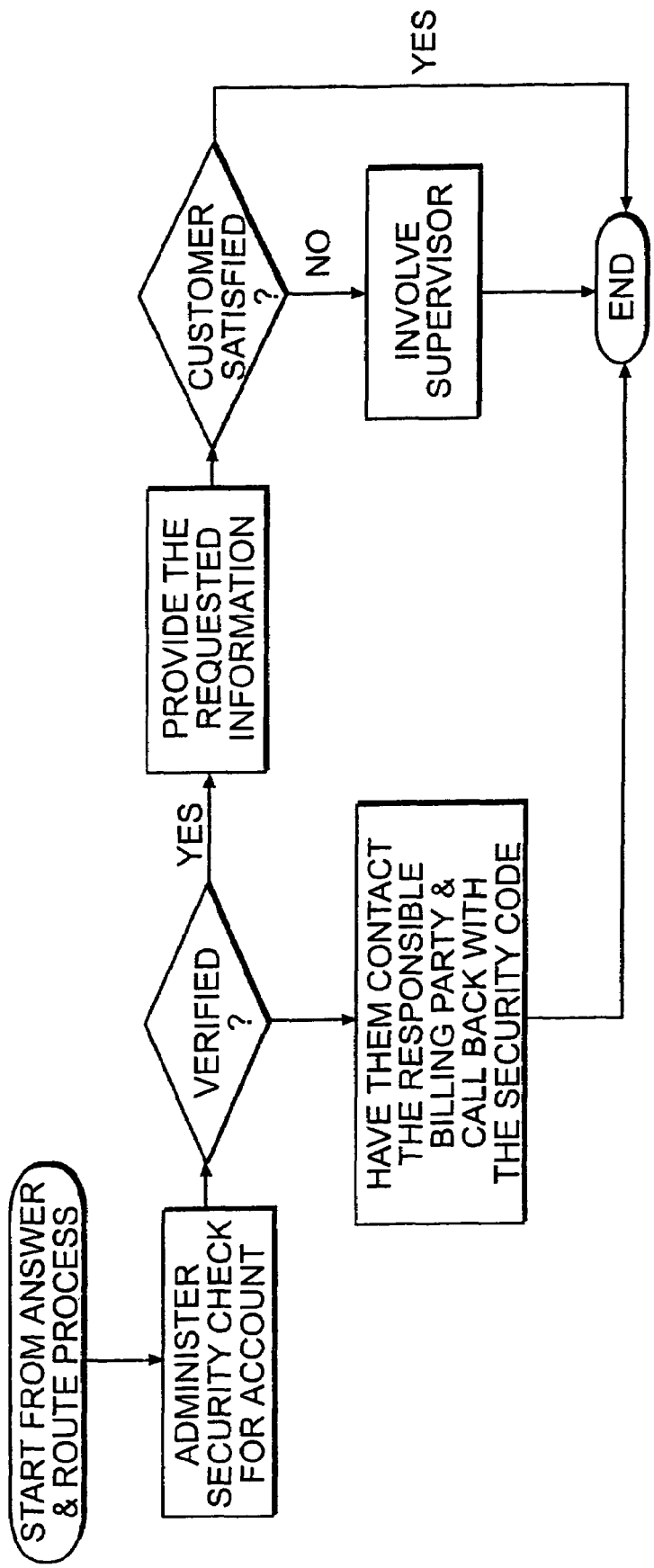
FIG. 34 is a flowchart depicting the steps involved in handling billing questions in a preferred embodiment of the present invention.

FIG. 30 depicts a process of flagging, and a process of restoring flagged service to an account. FIG. 31 depicts a process for removing a phone from a multi-phone account. FIG. 32 depicts a process of disconnecting a phone from a single phone account. FIG. 33 depicts a process for dealing with frequently asked questions and updating the standardized list of frequently asked questions for call center personnel. Most call center call traffic relates to, for example, billing questions about specific call charges. Elimination of detailed call records eliminates much of the billing question call traffic and of the associated costs. FIG. 34 is a flowchart that depicts a process for handling billing questions, in an embodiment of the present invention.

In light of the reduced cost offering available through the use of the present invention, market segments in which operators of prior wireless communication systems have shown limited or no interest may now be targeted by the use of the present invention. For example, individuals residing in households with income of less than approximately $75,000 per year generally have not historically been a target of marketing efforts by cellular operators, due to poor credit risk and low likelihood of use in a manner profitable to the operator. Operators often require credit checks, and credit checks alone may elliminate 30 to 60% of potential customers. Other users that are similarly neglected by wireless operators include, for example, new wage earners, such as users between ages 25 and 35, secondary income spouses, college and/or high school students, and teenagers, and other similar demographic groups that encounter difficulty with credit checks or long term, such as one year or more, service contracts. The service provided by the present invention may become the primary phone of the user participating in the service, particularly with respect to the demographic groups discussed herein above, and allows for the elimination of credit-check related fees to the operator.

In order to allow for the benefits set forth herein in accordance with the present invention, an existing network may be converted to a capacity based network by employing the techniques of the present invention. Table 9 depict the assumptions and differences between the present invention and a typical PCS based system, which may be used in the conversion of a PCS based system to a system according to the present invention.

TABLE 9

Key Assumptions in Converting a PCS-Type System to a System of the Present Invention

| Assumption/Criterion | PCS-Type System | Present Invention |
|---|---|---|
| Covered Pops | 1.0 m | 1.0 m |
| Covered Area | 1,200 km sq. | 1,200 km sq. |
| Cell Sites Coverage | 96 | 96 |
| Cell Sites Highway (between service areas) | 10 | 0 |

TABLE 9-continued

Key Assumptions in Converting a PCS-Type System
to a System of the Present Invention

| Assumption/Criterion | PCS-Type System | Present Invention |
| --- | --- | --- |
| Minutes of Use | 325 | 1000 |
| Busy Hour Days | 22 | 24 |
| Percent of Calls Blocked | 12% | 8% |
| Erlangs Per Subscriber | 0.030 Erlangs | 0.055 Erlangs |

Table 10 depicts some of the capital expenditure required to convert an existing network of the type known prior to the present invention to the business method, operation, and/or network of the present invention.

TABLE 10

Capital Expenditure to Convert an
Existing PCS-Type System to Wireless
Communication Network of the Present Invention

| PCS-Type System | PCS-Type System | Present Invention | Present Invention |
| --- | --- | --- | --- |
| Cell Sites Coverage | 96 | Additional Carriers | 155 |
| Highway Sites | 10 | Additional Optimization | $2.6 M |
| Total Capital Expenditure | $47.7 M | Total Capital Expenditure | $33.6 M |

Those of ordinary skill in the art will recognize that many modifications and variations of the present invention may be implemented. The foregoing description and the following claims are intended to cover all such modifications and variations.

That which is claimed is:

1. A method for providing flat-fee wireless communications services, said method comprising:
    setting a given rate associated with a given period of time for said wireless communications services in a service area for at least one subscriber; and
    enabling, for said at least one subscriber, unlimited use of said wireless communications services within said service area for said period of time upon receipt of a corresponding payment of said given rate;
    wherein said service area substantially coincides with a modeled geographic area indicative of anticipated participation of the at least one subscriber in at least one selected from the group consisting of: living, working, playing, shopping and traveling.

2. The method of claim 1, wherein said at least one subscriber comprises a plurality of subscribers.

3. The method of claim 1, further comprising:
    identifying a plurality of land-line local calling areas corresponding to at least a portion of said service area; and
    defining a wireless local calling area corresponding to said service area so as to include at least a portion of said identified land-line local calling areas.

4. The method of claim 1, wherein said wireless communications services are substantially limited to within said service area.

5. A method for providing wireless communications services to a plurality of users using a corresponding plurality of mobile communications devices within a geographic area, said method comprising:
    modeling a demand for said wireless communications devices for a territory using localized data, including demographic data, indicative of at least a portion of said users; and
    defining said geographic area based upon said modeled demand.

6. The method of claim 5, wherein said modeling comprises estimating a percentage of prospective subscribers that, within a given time segment, will be at a place selected from the group consisting of living, working and playing locations.

7. The method of claim 5, wherein said modeling further comprises estimating a percentage of said user's locations within a given time segment.

8. The method of claim 7, wherein said modeling further comprises determining a possible covered population.

9. The method of claim 5, wherein said modeling comprises using census block data.

10. The method of claim 5, wherein said modeling further comprises researching at least one of: housing developments in the service area, access points to transportation avenues, employers in the service area, traffic patterns and expected traffic volumes, recreational areas, and locations of existing cell sites.

11. The method of claim 10, wherein said research includes using at least one of: at least one record at a Chamber of Commerce, at least one telephone book, at least one economic development center, at least one newspaper, at least one department of transportation and at least one education institution.

12. The method of claim 5, wherein said modeling comprises using demographic data indicative of distinguishable anticipated user groups.

13. The method of claim 12, wherein said user groups includes at least one group selected from the group consisting of: teenagers, students, secondary wage earners, blue collar workers, vector based vehicular traffic counts and hot spot locations.

14. The method of claim 13, wherein said hotspot locations include at least one location selected from the group consisting of: a mall, convention center, sporting venue, transportation center or recreational facility.

15. The method of claim 5, wherein said modeling comprises using digital elevation maps, night light maps, cluster maps, topographic maps, road maps or political boundary maps.

16. A method for providing wireless communications services to a plurality of users using a corresponding plurality of mobile communications devices within a predetermined geographic area, said method comprising:
    setting a given price;
    in response to receiving a payment of said given price corresponding to one of said mobile communications devices, enabling unlimited use of said corresponding one of said mobile communications devices substantially only within said predetermined geographic area for a given temporal period; and
    wherein at least a portion of costs associated with said providing said wireless communications services are substantially mitigated as the plurality of users are motivated to originate and receive wireless communications based at least in part upon said given price and said unlimited use.

17. The method of claim 16, wherein said wireless communications services consist of services within the geographic area.

18. The method of claim 16, wherein said wireless communications services are not available outside of said geographic area using one of the plurality of mobile communications devices.

19. The method of claim 16, wherein said wireless communications services consist of local calling.

20. The method of claim 16, wherein said wireless communications services comprise local calling.

21. The method of claim 16, wherein said wireless communications services further comprise at least one additional service selected from the group consisting of: voice mail services, and pre-paid long distance services.

22. The method of claim 21, wherein said pre-paid long distance services are provided using voice-over-IP communications.

23. The method of claim 16, further comprising defining additional geographic areas of services, and enabling said wireless communications services in at least one other of said additional geographic areas.

24. The method of claim 23, wherein said wireless communications services are substantially not available outside of said geographic area and at least one other geographic area.

25. The method of claim 16, wherein said wireless communications services are provided via transceivers each having a link budget designed primarily based upon system capacity.

26. The method of claim 16, wherein said temporal period is recurring.

27. The method of claim 26, further comprising, for a subsequent one of said recurring temporal periods, if said payment is not received, disabling unlimited use of said corresponding one of said mobile communications devices in said predetermined geographic area.

28. The method of claim 16, wherein said costs are increasingly mitigated as said originating wireless communications increase as compared to said incoming wireless communications.

29. The method of claim 16, wherein said costs comprise at least one interconnect charge.

30. The method of claim 16, wherein said mobile communications devices are Code Division Multiple Access (CDMA) compatible.

31. The method of claim 16, wherein said mobile communications use a multiple access system.

32. A method for providing wireless communications services to a plurality of users using a corresponding plurality of mobile communications devices within a geographic area, said method comprising:
determining a predicted demand for said wireless communications devices for a territory in accordance with a plurality of localized data, wherein the plurality of localized data includes demographic data; and
defining said geographic area based upon said predicted demand.

33. The method of claim 32, wherein each of said regions corresponding to said defined geographic area include a number of potential users greater than a given threshold.

34. The method of claim 33, wherein said given threshold is about 10,000.

35. The method of claim 32, wherein said demographic data includes commercially available data.

36. The method of claim 32, wherein said demographic data is associated with at least one Ranally Trade Area.

37. The method of claim 32, further comprising dividing said defined geographic area into a plurality of service sectors, each sector defined so as to service at least about 10,000 users.

38. The method of claim 32, further comprising:
providing a plurality of cell sites positioned with respect to said geographic areas to service said geographic area;
determining a relative usage of at least two of said cell sites relative to at least one another; and
load balancing said at least two cell sites based upon said determining.

39. The method of claim 32, further comprising defining a local calling area including at least said geographic area.

40. The method of claim 39, further comprising:
identifying at least one region outside of said geographic area; and
determining at least one cost associated with interconnecting to said at least one region outside of said geographic area;
wherein, if said at least one cost is below a given threshold, said at least one region outside of said geographic area is included in said local calling area.

41. The method of claim 39, wherein:
said geographic region is divided into at least two local exchanges each having an associated plurality of local calling exchanges; and
said local calling area further comprises said pluralities of local calling exchanges.

42. The method of claim 32, further comprising defining multiple ones of said geographic area, wherein said geographic areas are substantially geographically isolated from one another.

43. A method for providing wireless communications services to a plurality of users using a corresponding plurality of mobile communications devices within a geographic area, said method comprising:
identifying select ones of said plurality of users responsible for a given portion of overall wireless communications services provided within the geographic area; and
upgrading ones of said mobile communications devices associated with said identified select users.

44. The method of claim 43, wherein said upgrading comprises replacing said ones of said mobile communications devices and terminating services to said replaced ones of said mobile communications devices.

45. A method for providing wireless communications services to a plurality of users using a corresponding plurality of mobile communications devices within a geographic area, said method comprising:
bundling, in a common package, at least one mobile communications device, wherein said at least one mobile communications device includes thereon free local ones of said wireless communications services within the geographic area for a given temporal period commencing substantially contemporaneously with a registration of said at least one mobile communications device.

46. The method of claim 45, further comprising:
setting a given price; and
in response to receiving a payment of said given price corresponding to one of said mobile communications devices, enabling unlimited use of said corresponding one of said mobile communications devices in said predetermined geographic area for a successive given temporal period;
wherein at least one cost associated with said providing said wireless communications services is substantially mitigated as users are motivated to originate and receive wireless communications based at least in part upon said given price and said unlimited use limited to within the geographic area.

47. The method of claim 46, further comprising:
determining a predicted demand for said wireless communications devices using a localized demand model, wherein the localized demand model includes demographic data, and, defining said geographic area based upon said predicted demand.

48. A system for providing wireless communications services to a plurality of users using a corresponding plurality of mobile communications devices within a geographically limited service area, said system comprising:

a plurality of cell sites positioned within said service area so as to transmit and receive radio frequency (RF) signals indicative of said wireless communications within said service area;

wherein, said service area substantially coincides with a modeled geographic area indicative of anticipated participation of the at least one subscriber in at least one selected from the group consisting of living, working, playing, shopping and traveling.

* * * * *

UNITED STATES PATENT AND TRADEMARK OFFICE
CERTIFICATE OF CORRECTION

| | | |
|---|---|---|
| PATENT NO. | : 7,454,193 B2 | Page 1 of 1 |
| APPLICATION NO. | : 11/635807 | |
| DATED | : November 18, 2008 | |
| INVENTOR(S) | : Hutcheson et al. | |

It is certified that error appears in the above-identified patent and that said Letters Patent is hereby corrected as shown below:

In the Specification

In column 5, at line 49 delete, "FIG. 8 is a map" and insert -- Figs. 8a-8d are maps --.

In column 5, at line 52 delete, "FIG. 9 is a map" and insert -- Figs. 9a-9d are maps --.

Signed and Sealed this
Thirteenth Day of May, 2014

Michelle K. Lee
*Deputy Director of the United States Patent and Trademark Office*